(12) United States Patent
Cohen

(10) Patent No.: US 9,910,985 B2
(45) Date of Patent: *Mar. 6, 2018

(54) APPARATUS AND METHOD FOR IDENTIFYING SIMILARITY VIA DYNAMIC DECIMATION OF TOKEN SEQUENCE N-GRAMS

(71) Applicant: The Johns Hopkins University, Baltimore, MD (US)

(72) Inventor: Jonathan D. Cohen, Glenwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/754,869

(22) Filed: Jun. 30, 2015

(65) Prior Publication Data

US 2015/0302197 A1 Oct. 22, 2015

Related U.S. Application Data

(63) Continuation of application No. 14/248,622, filed on Apr. 9, 2014, now Pat. No. 9,111,095, and a
(Continued)

(51) Int. Cl.
*G06F 12/14* (2006.01)
*G06F 21/56* (2013.01)
*G06F 17/27* (2006.01)

(52) U.S. Cl.
CPC .......... *G06F 21/562* (2013.01); *G06F 17/277* (2013.01); *G06F 21/564* (2013.01)

(58) Field of Classification Search
CPC ..... G06F 21/562; G06F 17/277; G06F 21/564
(Continued)

(56) References Cited

U.S. PATENT DOCUMENTS 5,452,442 A 9/1995 Kephart
6,757,675 B2 6/2004 Aiken et al.
(Continued)

FOREIGN PATENT DOCUMENTS

EP 2182458 5/2010
FR 2645354 5/1990
(Continued)

OTHER PUBLICATIONS

Ran Jin et al., Normalization towards Instruction Substitution Metamorphism Based on Standard Instruction Set, publication, IEEE 2007 International Conference on Computational intelligence arid Security Workshops, pp. 795-798.
(Continued)

*Primary Examiner* — Aravind Moorthy
(74) *Attorney, Agent, or Firm* — Sung T. Kim

(57) ABSTRACT

An apparatus for identifying related code variants or text samples includes processing circuitry configured to execute instructions for receiving query binary code, processing the query binary code to generate one or more query code fingerprints comprising compressed representations of respective functional components of the query binary code, generating token sequence n-grams of the fingerprints, hashing the n-grams, partitioning samples by length to compare selected samples based on length, and identifying similarity via dynamic decimation of token sequence n-grams.

21 Claims, 14 Drawing Sheets

Related U.S. Application Data continuation-in-part of application No. 13/784,245, filed on Mar. 4, 2013, now Pat. No. 9,003,529.

(60) Provisional application No. 61/694,369, filed on Aug. 29, 2012, provisional application No. 61/844,975, filed on Jul. 11, 2013.

(58) Field of Classification Search
USPC .................................................. 726/22–24
See application file for complete search history.

(56) References Cited

U.S. PATENT DOCUMENTS

| | | | |
|---|---|---|---|
| 7,809,510 | B2 | 10/2010 | Milosavljevic |
| 7,895,515 | B1 | 2/2011 | Oliver et al. |
| 8,032,310 | B2 | 10/2011 | Stenger et al. |
| 8,732,825 | B2 | 5/2014 | Park et al. |
| 9,111,095 | B2 * | 8/2015 | Cohen .................. G06F 21/562 |
| 2006/0025988 | A1 | 2/2006 | Xu et al. |
| 2008/0168564 | A1 * | 7/2008 | Lerouge .................. G06F 21/64 726/26 |
| 2008/0222094 | A1 | 9/2008 | Cox |
| 2009/0172815 | A1 | 7/2009 | Gu et al. |
| 2009/0293125 | A1 | 11/2009 | Szor |
| 2010/0064368 | A1 | 3/2010 | Stolfo et al. |
| 2010/0199328 | A1 | 8/2010 | Heins et al. |
| 2011/0040488 | A1 | 2/2011 | Singh et al. |
| 2011/0055192 | A1 | 3/2011 | Tang et al. |
| 2011/0161357 | A1 | 6/2011 | Kataoka et al. |
| 2011/0270533 | A1 | 11/2011 | Zhang et al. |
| 2012/0072988 | A1 | 3/2012 | Agrawal |
| 2012/0095693 | A1 | 4/2012 | Ganeshalingam et al. |
| 2012/0151590 | A1 | 6/2012 | Rihn et al. |
| 2013/0091571 | A1 | 4/2013 | Lu |
| 2013/0283382 | A1 | 10/2013 | Kim et al. |
| 2014/0068768 | A1 | 3/2014 | Lospinuso et al. |
| 2014/0223565 | A1 | 8/2014 | Cohen |
| 2015/0088839 | A1 * | 3/2015 | Jones .................. G06F 3/0608 707/692 |

FOREIGN PATENT DOCUMENTS

| | | |
|---|---|---|
| GB | 2355837 | 5/2001 |
| JP | 2007133682 | 5/2007 |
| JP | 2010250389 | 11/2010 |
| JP | 2012073718 | 4/2012 |
| WO | 2007/100916 | 9/2007 |

OTHER PUBLICATIONS

Kai Huang et al., ISMCS: An Intelligent Instruction Sequence based Malware Categorization System, National Science Foundation of China under Grant No. 10771176 and Guangdong Province Foundation under Grant 2006A090300017, (2008) 4 pages.

Rafiqul Islam et al., Classification of Malware Based on String and Function Feature Selection, publication, IEEE 2010 Second Cybercrime and Trustworthy Computing Workshop, pp. 9-17.

Silvio Cesare et al., Malware Variant Detection Using Similarity Search over Sets of Control Flow Graphs, publication, IEEE 2011 International Joint Conference of IEEE TrustCom-11/IEEE ICESS-11/FCST-11, pp. 181-189.

Silvio Cesare et al., Malwise—An Effective and Efficient Classification System for Packed and Polymorphic Malware, publication, IEEE Transactions on Computers, (2012) pp. 1-14.

Yi Chen et al., Malicioius Software Detection Using Multiple Sequence Alignment and Data Mining, publication, IEEE 2012 26th IEEE International Conference on Advanced Information Networking and Applications, pp. 8-14.

P. Vinod et al., MOMENTUM: MetamOrphic Malware Exploration Techniques Using MSA signatures, publication, IEEE 2012 International Conference on Innovations in Information Technology (IIT), pp. 232-237.

Lukas Durfina et al., Design of an automatically Generated Retargetable Decompiler,Recent Researches in Circuits, Systems, Communications and Computers, (2011) pp. 199-204.

Lukas Durfina et al., Advanced Static Analysis for Decompilation Using Scattered Context Grammars, Recent Researches in Mathematical Methods in Electrical Engineering and Computer Science, (2011) pp. 164-169.

Yanfang Ye et al., Automatic Malware Categorization Using Cluster Ensemble, KDD'10, Jul. 25-28, Washington, DC, Copyright 2010, 10 pgs.

Wei Ming Khoo et al., Unity in diversity: Phylogenetic-inspired techniques for reverse engineering and detection of malware families, publication, IEEE 2011 First SysSec Workshop, pp. 3-10.

Scott McGhee, Pairwise Alignment of Metamorphic Computer Viruses, (2007) Master's Projects, San Jose State University, SJSU ScholarWorks, Jan. 1, 2007, pp. 1-55.

Timothy Daly et al., Concurrent Architecture for Automated Malware Classification, publication, IEEE Proceedings of the 43rd Hawaii International Conference on system Sciences—2010, pp. 1-8.

Timothy Daly et al., Concordia: Google for Malware, manuscript, Feb. 23, 2011, pp. 1-14.

Silvio Cesare, Effective Flowgraph-Based Malware Variant Detection, presentation, Jan. 6, 2012, pp. 1-18.

* cited by examiner

US 9,910,985 B2

APPARATUS AND METHOD FOR IDENTIFYING SIMILARITY VIA DYNAMIC DECIMATION OF TOKEN SEQUENCE N-GRAMS

CROSS-REFERENCE TO RELATED APPLICATIONS

This application is a continuation of co-pending U.S. patent application Ser. No. 14/248,622, entitled "APPARATUS AND METHOD FOR IDENTIFYING SIMILARITY VIA DYNAMIC DECIMATION OF TOKEN SEQUENCE N-GRAMS," filed Apr. 9, 2014, which is a continuation-in-part of co-pending U.S. patent application Ser. No. 13/784,245, entitled "APPARATUS AND METHOD FOR IDENTIFYING RELATED CODE VARIANTS IN BINARIES," filed Mar. 4, 2013, which claims priority to and the benefit of U.S. Provisional Application Ser. No. 61/694,369 filed on Aug. 29, 2012, and U.S. patent application Ser. No. 13/784,245 also claims priority to and the benefit of U.S. Provisional Application Ser. No. 61/844,975 filed on Jul. 11, 2013, the contents of each of which are hereby incorporated herein by reference in their entireties.

TECHNICAL FIELD

Example embodiments generally relate to analysis techniques for determining similarity and, in particular, relate to identification of related code variants in binaries and identification of near duplicates in text samples.

BACKGROUND

The easy and routine distribution of computer code in source and binary form, and the importance of those distributions, has engendered strongly-felt needs to identify code theft, code provenance, and the presence of malware. Each of these needs may be met, at least in part, by the ability to rapidly compare test code samples to a large library of reference code samples to detect reference samples similar to the test samples. In particular, there is a strong desire to recognize when incoming code binaries are variants of known examples of malware.

The most promising approaches to recognizing code similarity typically do so by transforming the code samples into streams of tokens. These tokens can represent source characters, words, functional names, op-codes, calls, or other features or can represent parallel features in code binaries. For example, some methods produce token streams of characters, similar to DNA streams, drawn from sections of code binaries. Other methods of code similarity detection may be based on token streams of op-codes. Still other methods operate based on streams of tokens drawn from source code, in which structural elements are reduced to single-letter tokens. Some solutions may describe methods based on tokens representing calls to system routines during runtime.

Concurrently, the internet has offered an explosion of text documents leading to a strongly-felt need to recognize similar passages of text for the purposes of detecting plagiarism in academic environments, establishing provenance, and reducing duplication. The most successful approaches to bulk detection of document similarity have also been based on converting document samples to token streams, with those tokens representing words or characters in the documents.

In some examples, each sample is converted to a token stream, from which n-grams are extracted to form a signature of the sample. A library of references is formed by recording the signatures of reference samples, together with identifying information. To examine a test sample, its signature is constructed in a parallel manner, and the signature is compared to those in the library. References whose signatures are sufficiently similar to the signature of the test sample are reported as similar.

An n-gram is an n-long sequence of consecutive tokens drawn from a stream of tokens. Representing a token stream by its constituent n-grams makes a uniform basis of comparison of token streams, provides tolerance of small differences between token streams, and offers rapid computation. One can also easily represent n-grams by their numeric hash values, thereby saving space and providing a numeric index or key into tables for recording and look-up purposes. Accordingly, one can construct signatures of token streams using n-gram hash values, rather than using n-grams directly.

Despite the strongly-felt needs and considerable work in this area, conventional methods generally do not offer methods that achieve a processing speed and library capacity that can address the anticipated need for rapid bulk processing of input samples against a voluminous library of references.

Accordingly, it may be desirable to continue to develop improved and/or more efficient mechanisms by which protection against malware may be provided. Moreover, in some cases, the detection of related code variants in binaries outside the context of malware detection may also be useful.

BRIEF SUMMARY OF SOME EXAMPLES

Accordingly, some example embodiments may enable the provision of a relatively scalable and efficient solution for addressing the issues described above. In one example embodiment, an apparatus for identifying related code variants or text samples may include processing circuitry configured to execute instructions for receiving query binary code, processing the query binary code to generate one or more query code fingerprints comprising compressed representations of respective functional components of the query binary code, generating token sequence n-grams of the fingerprints, hashing the n-grams, partitioning samples by length to compare selected samples based on length, and identifying similarity via dynamic decimation of token sequence n-grams.

In another example embodiment, an apparatus for identifying similarity via dynamic decimation of token sequence n-grams is provided. The apparatus may include processing circuitry configured to execute instructions for accepting a score threshold T, calculating a library cell function I( ) that maps a range of sizes to a library cell, calculating a decimation factor function K( ) that maps a library cell to a non-negative number, calculating an acceptance function A( ), dependent upon an acceptance probability, that will either accept or reject an n-gram input, defined so that the fraction of n-grams accepted will be approximately equal to the acceptance probability, receiving a plurality of reference samples, and processing each reference sample of the plurality of reference samples. The processing may be accomplished to produce a sequence of reference tokens from the reference sample, produce an estimate of the number of n-grams in the reference sample, choose a library cell equal to I( ) applied to the estimate of the number of n-grams, choose a reference decimation factor F equal to K( ) applied to the library cell, produce a decimated reference signature consisting of the hash values of those n-grams present in the sequence of reference tokens that are accepted by the acceptance function A( ), based on an acceptance probability equal to the reciprocal of decimation factor F, and record the decimated reference signature in the library cell together with an identifier of the reference sample. The method may further include receiving one or more test samples and processing each test sample including operations such as producing a sequence of test tokens from the test sample, producing an estimate of the number of n-grams in the test sample, choosing a set of library cells on the basis of I( ) applied to the estimate, for each library cell of the set of library cells choosing a test decimation factor F equal to K( ) applied to the library cell and producing a decimated test signature consisting of the hash values of those n-grams present in the sequence of test tokens that are accepted by the acceptance function A( ) based on an acceptance probability equal to the reciprocal of decimation factor F, and for each decimated reference signature in the library cell, scoring the decimated test signature against the decimated reference signature and reporting the resulting score and identifier stored with the decimated reference signature in the event that the score meets or exceeds T.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
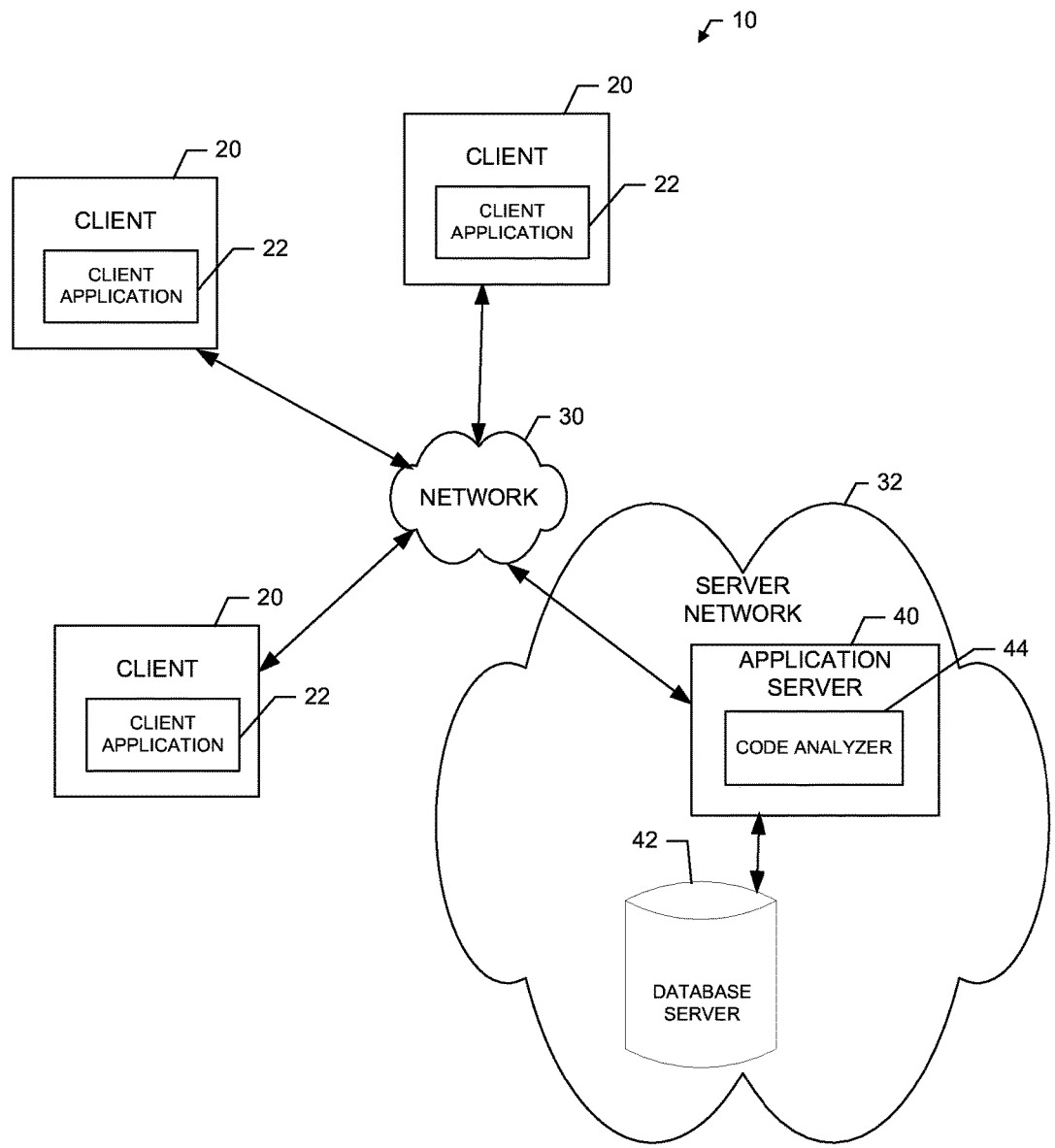
FIG. 1 illustrates a functional block diagram of a system that may be useful in connection with identification of related code variants in binaries according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments of the present invention may relate to the provision of malicious software detection. However, it should also be appreciated that example embodiments may further provide utility in connection with identifying related code variants in other contexts as well including the detection of near duplicates in text samples. In some embodiments, binaries associated with software or content may be analyzed on the basis of a lossy compression that is employed to generate a fingerprint of the functional components of binaries. This fingerprint may be similar to a DNA code of the binaries, which essentially acts as a transformation technique that compresses the input by as much as 95% with the results being represented as a sequence of letters resembling DNA strings. Such a lossy compression may enable the relatively efficient and accurate clustering of related malware and may also support recursive analysis of malware variants in an automated system. Thus, for example, worms, viruses and other malware may be detected to improve the security and stability of platforms that operate on executable code, even when slight changes have been made to the code. Moreover, embodiments may be applicable to personal computer (PC) programs, mobile terminal programs or executable code for use with any execution platform. Additionally, based on the substantial compression that is attainable by developing these "fingerprints" or "DNA" strings, this type of transformation will generally obscure variations that are unimportant, while preserving sufficient specificity to separate functions of different nature. Given a library of reference functions, an unknown function can be transformed similarly, and matches or near matches with contents of the library may reveal the nature of the unknown.

To be most useful, the method of comparison should permit bulk processing of unknowns against a sizeable library in a timely fashion. Accordingly, by further processing the "fingerprints" or "DNA" strings generated by an example embodiment with n-gram based scoring, substantial savings may be achieved in terms of both space and time with little degradation of the scores. After the n-gram based transformation is accomplished on the code "fingerprints" or "DNA" strings, rather than recording the n-grams themselves, an example embodiment may record integer hashes of consecutive n-grams. Resultant samples may be partitioned by length so that only those samples having lengths that could result in interesting scores may actually be compared. As such, for example, a dictionary of reference samples may be partitioned into cells in a strategic way, as described in greater detail below. The partitioning may lead to speed increases since the number of candidate matches will be likely to be reduced for each unknown. In some embodiments, the set of n-gram hash values may also be decimated by some number (e.g., k), meaning that a fraction of about 1/k of the values will be kept. However, rather than selecting every kth value, or selecting one kth at random, an example embodiment may choose n-gram hash values that are divisible by k. The decimation may enable further memory and CPU time savings.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment, although alternative example embodiments are not limited thereto. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing and/or analyzing binary code as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of certain binary codes associated with software or content being analyzed (e.g., in the database server 42). The information may include a "fingerprint" and/or "DNA" code associated with the binary code that may be useful in the analysis described herein by clients 20 for use in connection with practicing example embodiments. Alternatively or additionally, the application server 40 may be configured to provide analytical tools for use by the clients 20 in accordance with example embodiments.

In some embodiments, for example, the application server 40 may therefore include an instance of a code analyzer 44 comprising stored instructions for handling activities associated with practicing example embodiments as described herein. As such, in some embodiments, the clients 20 may access the code analyzer 44 online and utilize the services provided thereby. However, it should be appreciated that in other embodiments, the code analyzer 44 may be provided from the application server 40 (e.g., via download over the network 30) to one or more of the clients 20 to enable recipient clients to instantiate an instance of the code analyzer 44 for local operation. As yet another example, the code analyzer 44 may be instantiated at one or more of the clients 20 responsive to downloading instructions from a removable or transferable memory device carrying instructions for instantiating the code analyzer 44 at the corresponding one or more of the clients 20. In such an example, the network 30 may, for example, be a peer-to-peer (P2P) network where one of the clients 20 includes an instance of the code analyzer 44 to enable the corresponding one of the clients 20 to act as a server to other clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the code analyzer 44 configured to operate in accordance with an example embodiment of the present invention. In this regard, for example, the code analyzer 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

As such, the environment of FIG. 1 illustrates an example in which provision of content and information associated with the analysis such as, for example, security or intelligence operations may be accomplished by a particular entity (namely the code analyzer 44 residing at the application server 40). However, it should be noted again that the code analyzer 44 could alternatively handle provision of content and information within a single organization. Thus, in some embodiments, the code analyzer 44 may be embodied at one or more of the clients 20 and, in such an example, the code analyzer 44 may be configured to handle provision of content and information associated with analytical tasks that are associated only with the corresponding single organization. Access to the code analyzer 44 may therefore be secured as appropriate for the organization involved and credentials of individuals or analysts attempting to utilize the tools provided herein.

Figure 2:
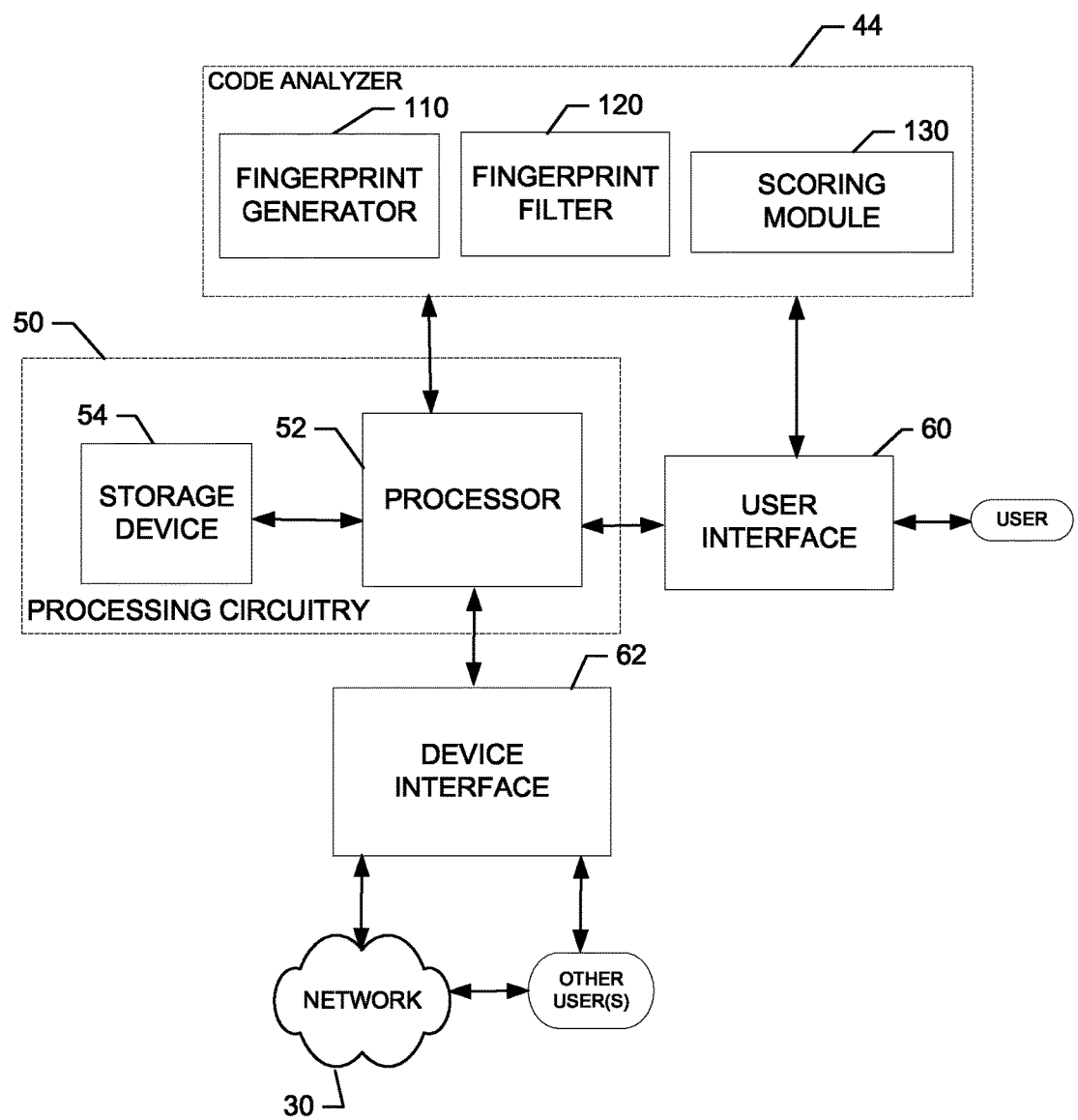
FIG. 2 illustrates a functional block diagram of an apparatus that may be useful in connection with identification of related code variants in binaries according to an example embodiment.

An example embodiment of the invention will now be described with reference to FIG. 2. FIG. 2 shows certain elements of an apparatus for provision of identification of related code variants in binaries according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of identification of related code variants in binaries is provided. The apparatus may be an embodiment of the code analyzer 44 or a device hosting the code analyzer 44. As such, configuration of the apparatus as described herein may transform the apparatus into the code analyzer 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the code analyzer 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the code analyzer 44 as described below.

The code analyzer 44 manager may include tools to facilitate the creation and distribution of analysis results via the network 30. In an example embodiment, the analysis results may include reports indicating threats identified and/or potential threats that merit further analysis. The reports may be generated on the basis of analytical processing performed by the code analyzer 44. In this regard, the code analyzer 44 may be configured to process binary code or codes that are provided thereto and compare the code or codes of content to be queried or analyzed to a library of known malware codes so that matches or near matches can be identified. In some embodiments, the comparison may actually be performed on a compressed representation of the code, and the compressed representation of the code may be referred to as a "fingerprint" or "DNA" of the code. The comparison performed may identify code or code portions that correspond to executable code that is known malware, or that appears to be a modified version of known malware.

In some embodiments, the code analyzer 44 may further include one or more components that contribute to the performance of the tasks or operations associated therewith. For example, as shown in FIG. 2, the code analyzer 44 may include a fingerprint generator 110, a fingerprint filter 120, and/or a scoring module 130. Each of the code analyzer 44, the fingerprint generator 110, the fingerprint filter 120, and the scoring module 130 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the code analyzer 44, the fingerprint generator 110, the fingerprint filter 120, and the scoring module 130, respectively, as described herein.

In an example embodiment, the fingerprint generator 110 may be configured to generate one or more fingerprints based on a binary file being analyzed. A "fingerprint" may be a representation of the code that is generated in accordance with a specific process performed in connection with an example embodiment to form a compressed representation of the binary file or portions thereof. In some cases, the compressed representation may be formed using a lossy compression technique that is executed with respect to functional portions of the binary file being analyzed. In some embodiments, the fingerprint may be generated based on a DNA sequencer type of operation via which the fingerprint generator 110 operates to ignore changes in file size (e.g., via use of padding) so that only executable portions are considered to identify the constituent portions of the binary file. The fingerprint that is generated may be unlike biological DNA in that the fingerprint, although descriptive of components of the binaries, cannot be used to reconstruct the original entity that forms the basis for the fingerprint. Thus, for example, the fingerprint cannot become a malware factory and the malware is never afforded access to a potential execution environment. Instead, the fingerprint generator 110 simply treats binary files as data and the fingerprint is generated without any portions of the binary files being executed.

The fingerprint filter 120 may be configured to filter or select fingerprints that may be similar to query fingerprints associated with a query file as described in greater detail below. In this regard, for example, the database server 42 may store a plurality of fingerprints associated with known binaries of interest (e.g., malware), and these known binaries of interest (and their fingerprints) may form the basis for comparison with query files and their respective fingerprints to identify similarities therebetween. Thus, for example, the fingerprint filter 120 may be configured to use n-gram filtering, or some other suitable comparison technique, to identify a plurality of fingerprints that are similar to one or more query fingerprints associated with a query file. The scoring module 130 may be configured to employ a scoring algorithm to generate scores that are indicative of a similarity or degree of correlation between the query fingerprints and the selected or filtered fingerprints that were judged to be similar based on operation of the fingerprint filter 120.

Figure 3:
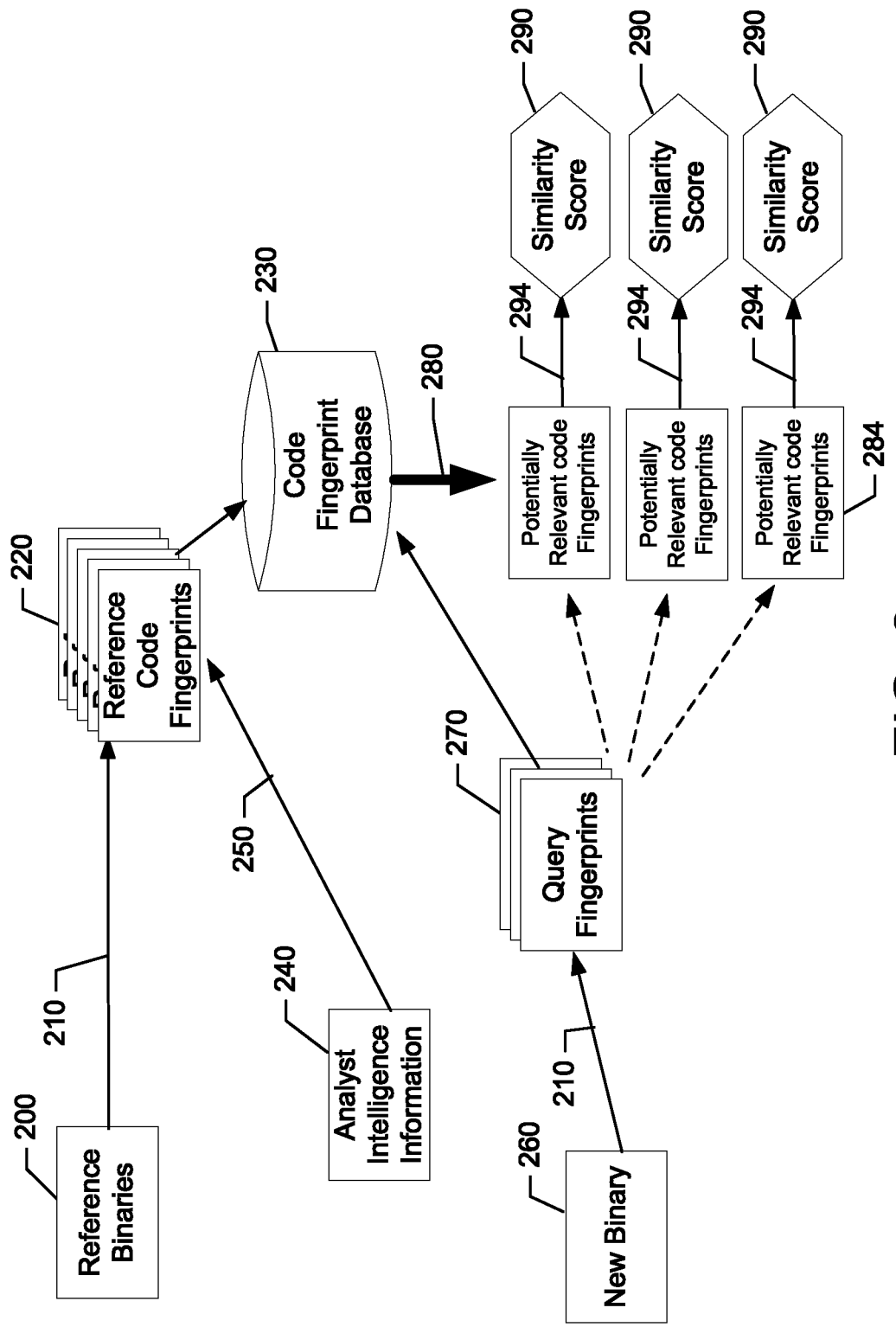
FIG. 3 illustrates a series of process flows that may be supported by an apparatus or system configured in accordance with an example embodiment.

In an example embodiment, the code analyzer 44 executes a process for identifying related code variants in binaries using the components described above. FIG. 3 illustrates process flows in accordance with an example embodiment. As shown in FIG. 3, reference binaries 200 may be provided based on past experience. The reference binaries 200 may be binary files that are or include malware. The reference binaries 200 may be preprocessed at operation 210. The preprocessing at operation 210 may generate a plurality of reference code fingerprints 220 (e.g., via operation of the fingerprint generator 110) that may be stored in a code fingerprint database 230 (e.g., the database server 42). Although not required, analyst intelligence information 240 may be added to one or more of the reference code fingerprints 220 at operation 250. In some cases, the analyst intelligence information 240 may include information about portions of each binary such as who wrote the code, what function the code portion performs, and/or the like.

The reference code fingerprints 220 remain in the code fingerprint database 230 and can be supplemented with additional fingerprints to grow the size of and otherwise update the database. Thus, the code fingerprint database 230 may be updated to add (or subtract) reference code fingerprints as appropriate over time. The addition of reference code fingerprints 220 may be accomplished by the performance of preprocessing at operation 210, or by direct importation of fingerprints. Moreover, in some embodiments, after code variants are identified via operation of the code analyzer 44 as described herein, fingerprints associated with code variants that have been identified may be added to the code fingerprint database 230.

In order to identify code variants, example embodiments may analyze new binary files 260 to determine whether they include malware. The analysis of such new binary files 260 may be accomplished responsive to conversion (via preprocessing similar to that accomplished in operation 210) of the new binary files 260 to corresponding multiple query fingerprints 270. After conversion, the reference code fingerprints 220 may be filtered at operation 280 to enable identification or selection of one or more potentially relevant code fingerprints 284. The filtering may be accomplished by the fingerprint filter 120 described above. In this regard, the selection of potentially relevant code fingerprints 284 may be accomplished using n-gram matching. Thereafter, a similarity score 290 may be determined at operation 294 for each of the potentially relevant code fingerprints 284 (e.g., via operation of the scoring module 130). The similarity score may be determined based on the content of the potentially relevant code fingerprints 284 as compared to the query fingerprints 270. As a result of the operations of FIG. 3, an efficient search may be conducted to determine which parts of a query file (e.g., the new binary file 260) are similar (and/or which files are similar). In particular, example embodiments may be scalable to large amounts of data so that large amounts of data can be successfully and quickly processed to find code variants, even if significant portions of the code have been modified.

The preprocessing (operation 210) of binary files to generate a fingerprint (e.g., a reference fingerprint or a query fingerprint) may be conducted in any suitable manner. However, according to an example embodiment, the preprocessing may be accomplished by breaking binary code into individual and comparable pieces or portions. These portions (i.e., code portions) may then be converted into a suitable form for efficient and accurate similarity computation. In an example embodiment, the conversion that occurs may be provided via a compressive mapping that is derived on the basis of functional portions of the binary code. As such, for example, relatively unchanging portions of the binary code that encapsulate the function and origin of the binary code may be extracted (e.g., by the fingerprint generator 110). Thus, a single binary code file may generate a plurality of different parts that reflect function, and those parts may each be processed into a compressed representation.

In an example embodiment, the compressed representation may employ lossy compression so that variance recognition may be enhanced while still using fast and efficient processing. As such, the fingerprints that are generated are considered to be a relatively low noise representation of the functional code portions with which each is associated. In some embodiments, the compressed representation that is performed employs an alphabet for compressive mapping based on functionally descriptive portions of the binary code.

Figure 4:
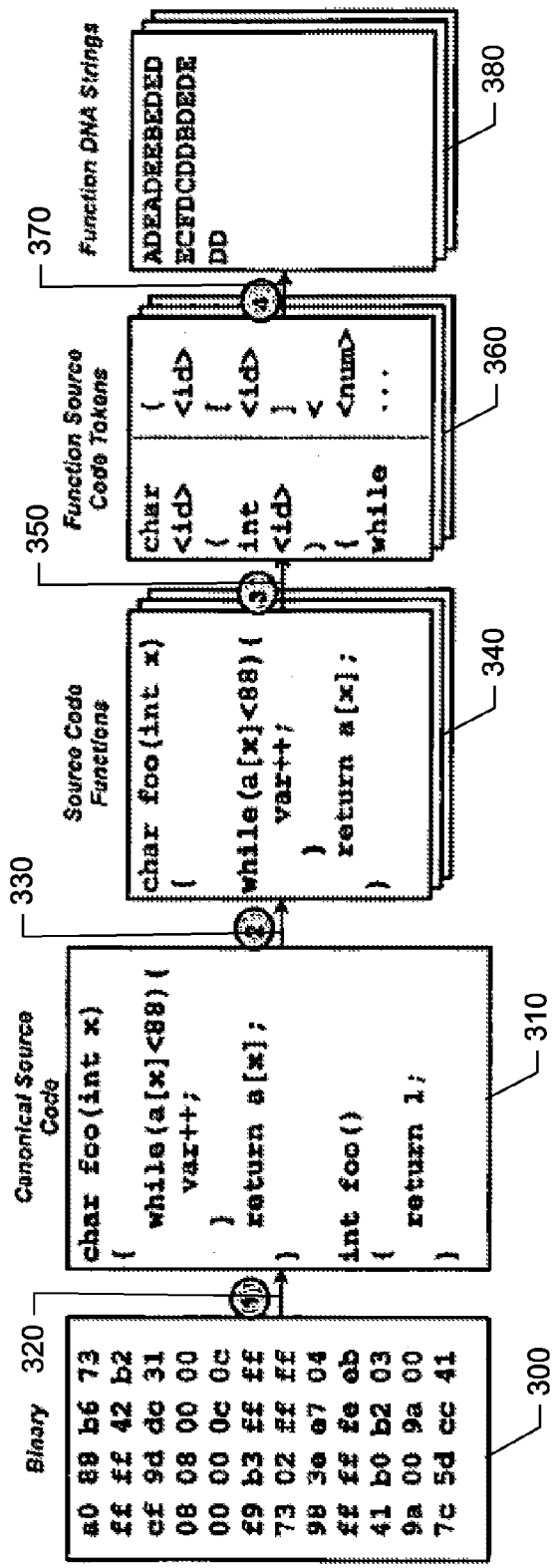
FIG. 4 illustrates one example of a preprocessing process that may be employed by a fingerprint generator of an example embodiment.

FIG. 4 illustrates one example of a preprocessing process that may be employed by the fingerprint generator 110 of an example embodiment. As shown in FIG. 4, binary code 300 may initially be converted into a canonical source code 310 at operation 320. As such, the binary code 300 may be converted into some canonical, architecture-independent representation. In some embodiments, the representation may be source code, accomplished by using a decompiler at operation 320. However, in some cases, the representation may be a functional representation that is an abstracted functional representation (such as code flow or data flow graphs). Essentially, any abstraction of the function may form an example of functional representation code that may be used in this context. Thus, as used herein, references to source code should be understood to be examples of functional representation code that may be employed in some embodiments. Thereafter, at operation 330, the source code generated by operation 320 may be broken into portions based on function. Each functional portion may become a separate, conceptual piece of the binary code. Accordingly, an output of operation 330 may be a plurality of source code functions 340 as shown in FIG. 4. During operation 350, tokens may be applied to identify or represent shadows of the executables compressively. Accordingly, during operation 350, each function is itself then broken down into smaller units that are represented as function source code tokens 360 of the code. The tokens may be individual symbols of the source code as defined by a relevant language. Some examples of tokens may include the name of a type, the name of a variable, a constant value (e.g., "80031"), or a symbol (e.g., ","). The order in which the tokens occur is maintained during operation 350.

Thereafter, at operation 370, each token is mapped to a compact symbol or alphabet character to define a fingerprint 380 (or functional DNA string) as shown in FIG. 4. In general, the mapping is not a one-to-one mapping. Many tokens can map to the same character, and some tokens may be omitted. However, a one-to-one mapping could be employed in some embodiments. The result of operation 370 may be a string of characters for each function. The string of characters may be considered to be a code fingerprint, or a function-DNA string.

The ability to preprocess binaries to generate code fingerprints (or function-DNA strings) may enable the code analyzer 44 to search a new binary to determine whether any code variants exist therein. In this regard, the code analyzer 44 is configured to break all binary code into functional portions and generate a compressed representation of such functional portions that can be mapped to a compact symbol to generate code fingerprints for the binaries. These code fingerprints can then be compared to determine variations. However, in an effort to enable a more efficient comparison, it may be desirable to only compare a query fingerprint to a limited number of potentially relevant code fingerprints. Thus, the potentially relevant code fingerprints may be first identified using filtering (e.g., via the fingerprint filter 120). The objective of filtering in accordance with one example embodiment may be to collect potentially relevant reference fingerprints from the fingerprint database. Although filtering may be optional, its employment may substantially increase searching efficiency by eliminating irrelevant DNA-strings from the search. An alternative may be to extract all function-DNA strings from the database and compute a similarity score for each one. However, this can require large amounts of processing power for a large fingerprint database.

Figure 5:
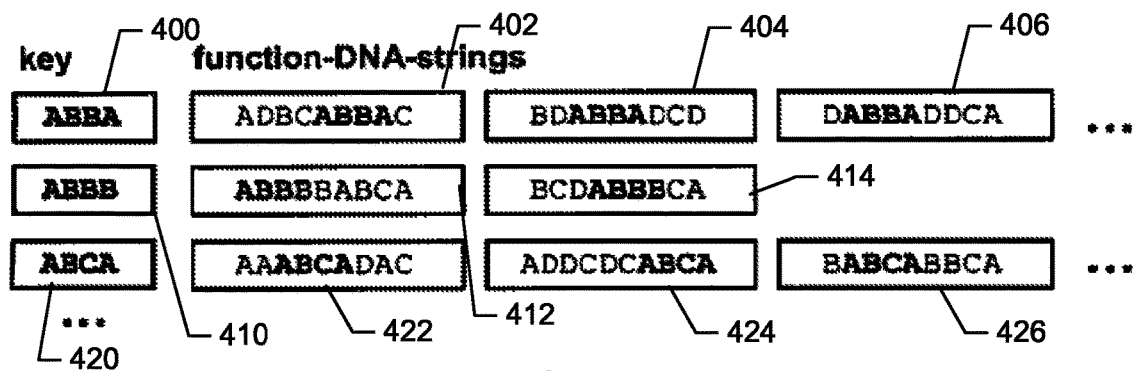
FIG. 5 illustrates an example of fingerprints indexed by the 4-grams they include in accordance with an example embodiment.

To enable filtering, features of a reference-function-DNA-string (e.g., a reference fingerprint) may be identified and the strings may be indexed according to the features. For example, the fingerprints may be stored in data structures such that one may be enabled to obtain all of the function-DNA-strings that have a particular feature relatively quickly. One example of a feature that can be used for indexing is an n-gram. An n-gram is a sequence of n consecutive characters. FIG. 5 illustrates fingerprints indexed by the 4-grams they include. Conceptually, each 4-gram can be thought of as a key (e.g., keys 400, 410 and 420) that has all of the function-DNA-strings (e.g., strings 402, 404, 406, 412, 414, 422, 424 and 426), that contain that 4-gram stored with it, so the corresponding strings can be retrieved quickly.

Example embodiments filter potentially relevant results for each query function-DNA-string. In this regard, for example, features of interest may be identified from a query fingerprint. Then all of the reference fingerprints that also contain m of those features may be collected using the index. For example, if the key 410 is a 4-gram defined as ABBB, then fingerprints including the 4-gram such as strings 412 and 414 may be collected. To reduce the size of the index and increase efficiency, the index may omit some features. For example, the index may omit extremely common 4-grams because such common 4-grams may cause the filtering step to collect many reference fingerprints. In any case, if filtering is employed, only a selected number of potentially relevant fingerprints may be further processed for similarity determinations by operation of the scoring module 130.

Similarity computation by the scoring module 130 may be accomplished after binaries have been preprocessed into the function-DNA-strings or code fingerprints as described above. If filtering is performed, the similarity computation may further be performed after potentially relevant code fingerprints have been selected. The specific computation used for determining a similarity score at the scoring module 130 may vary based on the desires of the system designer. However, in one example embodiment, scoring may be accomplished using a DNA-sequencing algorithm.

Figure 6:
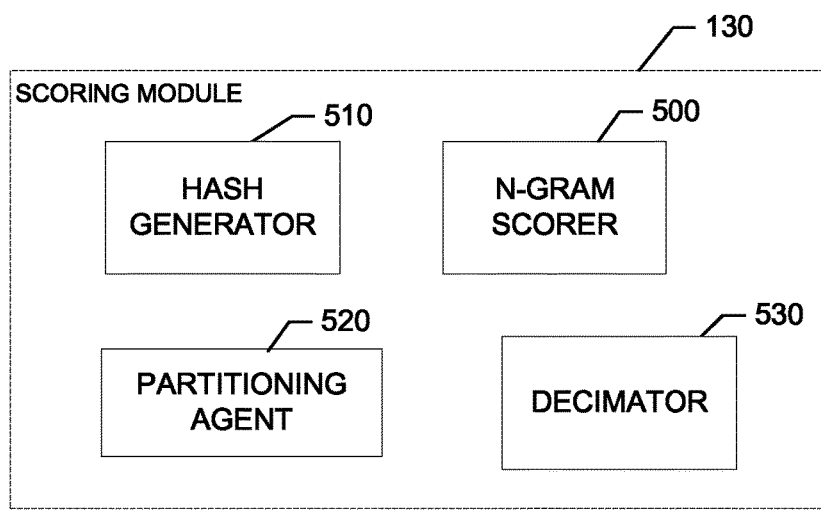
FIG. 6 illustrates a block diagram of components of the scoring module in accordance with an example embodiment.

As mentioned above, the scoring of an example embodiment may be accomplished using n-gram scoring in combination with hashing, partitioning and decimation. Accordingly, the scoring module 130 of an example embodiment may further include various functional components instantiated by configuring the processing circuitry 50 to perform the various functions associated with each functional component. FIG. 6 illustrates a block diagram of various components of the scoring module 130 in accordance with an example embodiment. As shown in FIG. 6, the scoring module 130 may include an n-gram scorer 500, a hash generator 510, a partitioning agent 520, and a decimator 530. The n-gram scorer 500, the hash generator 510, the partitioning agent 520, and the decimator 530 may each be embodied by configuration of the processing circuitry 50 as described above.

In an example embodiment, the n-gram scorer 500 may be configured to generate n-gram scores. An n-gram may be an n-long sequence of consecutive symbols. Thus, in an example embodiment, the n-gram may be a sequence of letters drawn from a token sequence that corresponds to the DNA sequence or fingerprint described above. In representing a sequence by n-grams, the number of times each n-gram occurred in a sequence, and perhaps also the locations of such occurrences may be recorded. Alternatively or additionally, a sequence could merely be represented by the set of n-grams that are found in it. As an example, suppose that an unknown (i.e., an unknown code, text or portion thereof) is represented by a set of n-grams $U=\{u_1, u_2, \ldots, u_u\}$ and a reference is represented by a set of n-grams $R=\{r_1, r_2, \ldots, r_r\}$. It may be possible to compare the reference and unknown by using Jaccard similarity:

$$J(U, R) = \frac{|U \cap R|}{|U \cup R|} = \frac{c}{u + r - c},$$

where $c=|U \cap R|$.

This similarity measure ranges from zero (no intersection) to one (equal sets). This score, i.e., the n-gram score, may be approximated by fast methods that, although some accuracy may be sacrificed, generally produce satisfactory results.

In an example embodiment, rather than recording the n-grams themselves, it may be preferable to record instead integer hashes of the n-grams. This may be an improvement from a storage space perspective since the integer may take less space than an n-gram of even moderate length. Additionally, the integer may serve directly as a table index. Because each n-gram may be similar to its predecessor, hashing of consecutive n-grams may be made very efficient by recursive calculation. As such, by judicious choice of hash function, the hash of the current n-gram may be obtained from the hash of the previous n-gram by including the effect of the new symbol and removing the effect of the symbol being dropped. The hash generator 510 may be configured to obtain the hash of n-grams for use in an example embodiment. As an example, suppose that a sample S contains distinct n-grams $\{g_1, g_2, \ldots, g_L\}$. Using a hash function h that maps n-grams to integers, S can be recorded in table T by posting the index (identifier) of S in T at positions $\{h(g_1), h(g_2), \ldots, h(g_L)\}$. After recording a library of samples in T, each entry in T will contain a list of samples holding an n-gram that hashes to that entry. To score an unknown sample string against the reference samples, it is only necessary to hash the n-grams in the unknown (e.g., using the hash generator 510), look each up in T, and obtain both the candidate references that might match (that is, any that occur in the entries examined), and the number of common n-grams. Such a hashing scheme may enable the Jaccard score J to be evaluated with the caveat that the n-gram hashes may collide. Since each score derives from many n-grams, the occasional collision is not likely to be a problem.

To illustrate an example, suppose that two samples whose n-gram sets are A and B, respectively, are compared. Without loss of generality, suppose that $|B|=r|A|$, $r \geq 1$. Then the best Jaccard similarity score that could be achieved would be when $A \subset B$, in which case, $J(A,B)=1/r$. Generally, then, $J(A,B) \leq 1/r$. Now if there is only interest in sample pairs whose similarity is at least $\rho$, then all that would be needed is a comparison of A and B if $r \leq 1/\rho$, since larger size differences will guarantee rejection.

This suggests that it is possible to partition samples by length and only compare those samples whose lengths could result in interesting scores. The partitioning agent 520 may be configured to execute such partitioning for example embodiments. In particular, a dictionary of reference samples partitioned (e.g., via the partitioning agent 520) into cells may be created such that the ith cell contains all samples of length L satisfying $\rho^{-i} \leq L < \rho^{-(i+1)}$, i=0, 1, 2, .... An unknown of length L then has a nominal cell index $i=\lfloor -\log(L)/\log(\rho) \rfloor$, but must be compared to unknowns in cells i, i−1, and i+1. As an example, if the threshold for an interesting score is $\rho=0.5$, then the reference space is partitioned into octaves—groups differing by a factor of 2 in length. If $\rho=0.1$, then the partition is by decades. Partitioning in this manner may further improve speed performance since, as mentioned above, the number of candidate matches is likely to be reduced for each unknown. In this context, the "length" of a sample means either the size of the sample's n-gram set or a proxy for that size such as the number of tokens in the sample.

It may not be necessary or desirable to compare every n-gram of the samples since each n-gram may say a great deal about its neighbors. Accordingly, it may seem sufficient to keep n-grams at a selected sampling frequency. In some cases, unless one is particularly unlucky, the type of spot checking that may be accomplished via this sampling of n-grams may achieve the same results (perhaps with some variance) as long as a sufficient number of n-grams are retained and those n-grams are somehow representative. Accordingly, it may be possible to employ the decimator 530 to decimate the n-gram hash set by some number k, meaning that a fraction of about 1/k of the values may be kept.

Although this is the case, it may not be desirable to simply take every kth value, since there may be a complete mismatch between two samples that differ only by the addition of one symbol at the front. It may also not be desirable to choose the kth value at random, since identical samples would be represented by different (even disjointed) sets of n-grams. Accordingly, some embodiments may adopt an approach of choosing the n-gram hash values that are divisible by k. Similarly, some embodiments may choose n-gram hash values that are congruent to some specified integer, modulo k.

Decimation in this manner may provide further memory savings (e.g., by a factor of about k) and may also save on CPU time (again by a factor of about k). Restraint on increasing k comes from the observation that the number of surviving n-grams must be sufficient to offer the desired discrimination. Suppose that it is concluded that at least m n-grams should be retained. Looking at all the samples $\{S_i\}$ it may be desirable to process, $$k_i = \text{Max}\left\{1, \left\lfloor \frac{1}{m}\text{Min}\{|S_i|\} \right\rfloor \right\}$$

may be chosen, where $|S_i|$ is the number of n-grams in sample i. In fact, k may be chosen to be the first prime below this value to avoid biases that might be present in hashing n-grams over a small alphabet. For each sample, the set of selected n-gram hash values of that sample may be referred to as the "signature" of the sample.

Decimation may cause issues by virtue of the fact that the decimation factor is constrained by the smallest sample. Indeed, samples may exist that have a length that is less than m, so that no decimation is possible. However, if it is supposed that a dictionary of references is partitioned such that the ith cell contains samples of length L satisfying $\rho^{-i} \leq L < \rho^{-(i+1)}$, $i=0, 1, 2, \ldots$, then in order to maintain a minimum number of m n-grams in each reference sample, references in the ith cell can be decimated by $k_i=\text{Max}\{1, \lfloor \rho^{-i}/m \rfloor\}$. (Decimation by 1 is equivalent to no decimation at all.) This can result in a huge savings of space, since the longer samples will be decimated more; the total space will be proportional to the number of references, largely independent of their size.

Accordingly, partitioning not only saves time because it reduces the number of candidates to examine, but it also allows custom decimations, resulting in much larger savings in space and time. As mentioned above, a prime value of k may be chosen to avoid biases. Although the scheme suggests that partitions may be created going all the way down to a size of 1, in practice, all cells that hold sizes smaller than m may be grouped together, since they forbid decimation.

Figure 7:
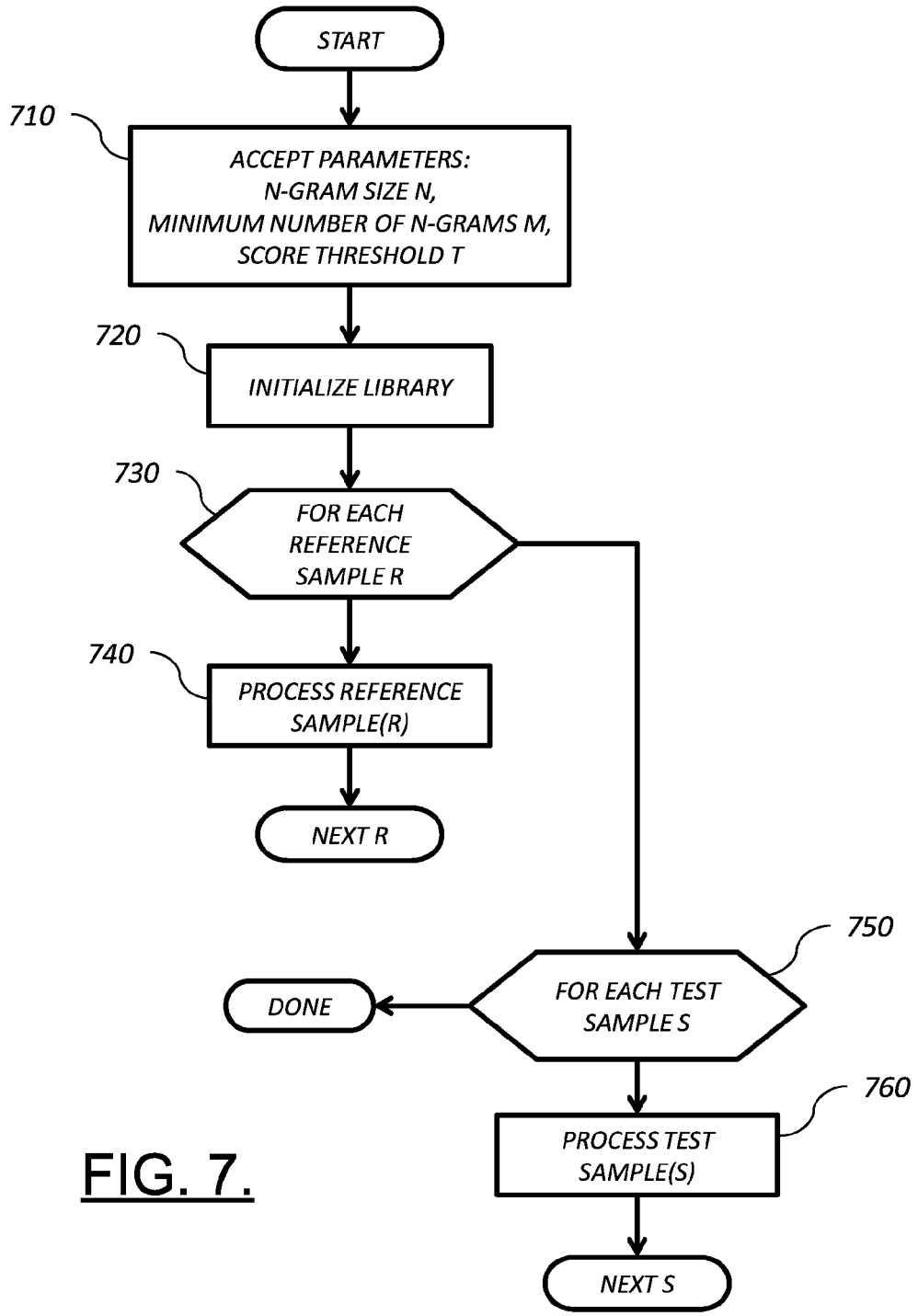
FIG. 7 illustrates a flow diagram of one example process employing an exemplary embodiment.

FIG. 7 illustrates a flow diagram of one example process employing an exemplary embodiment. In operation 710, design parameters may be accepted and recorded for subsequent steps to use; these parameters may include N, which specifies the n-gram size, M, which specifies the minimum desired number of n-grams per signature, and T, which specifies the score threshold.

A reference library (which may be provided in memory or the storage device 54) may be initialized at operation 720. The details of the initialization may depend on the chosen structure of the library. The library may include a plurality of library cells, each of which may include its decimation factor, summary records for reference samples stored there filed under their respective unique reference sample IDs, and reference sample IDs indexed by n-gram hash values. Each n-gram value index may have any number of reference sample IDs stored under it.

Once library initialization is completed, operation 730 may be executed to ensure that each reference sample is processed according to operation 740, which is amplified below.

Upon completion of reference processing, operation 750 may ensure that each test sample is processed according to operation 760, which is amplified below. It should be understood that operation 750 may process all test samples on hand and then reach completion, or may process test samples as they become available, perhaps over a protracted period.

Figure 8:
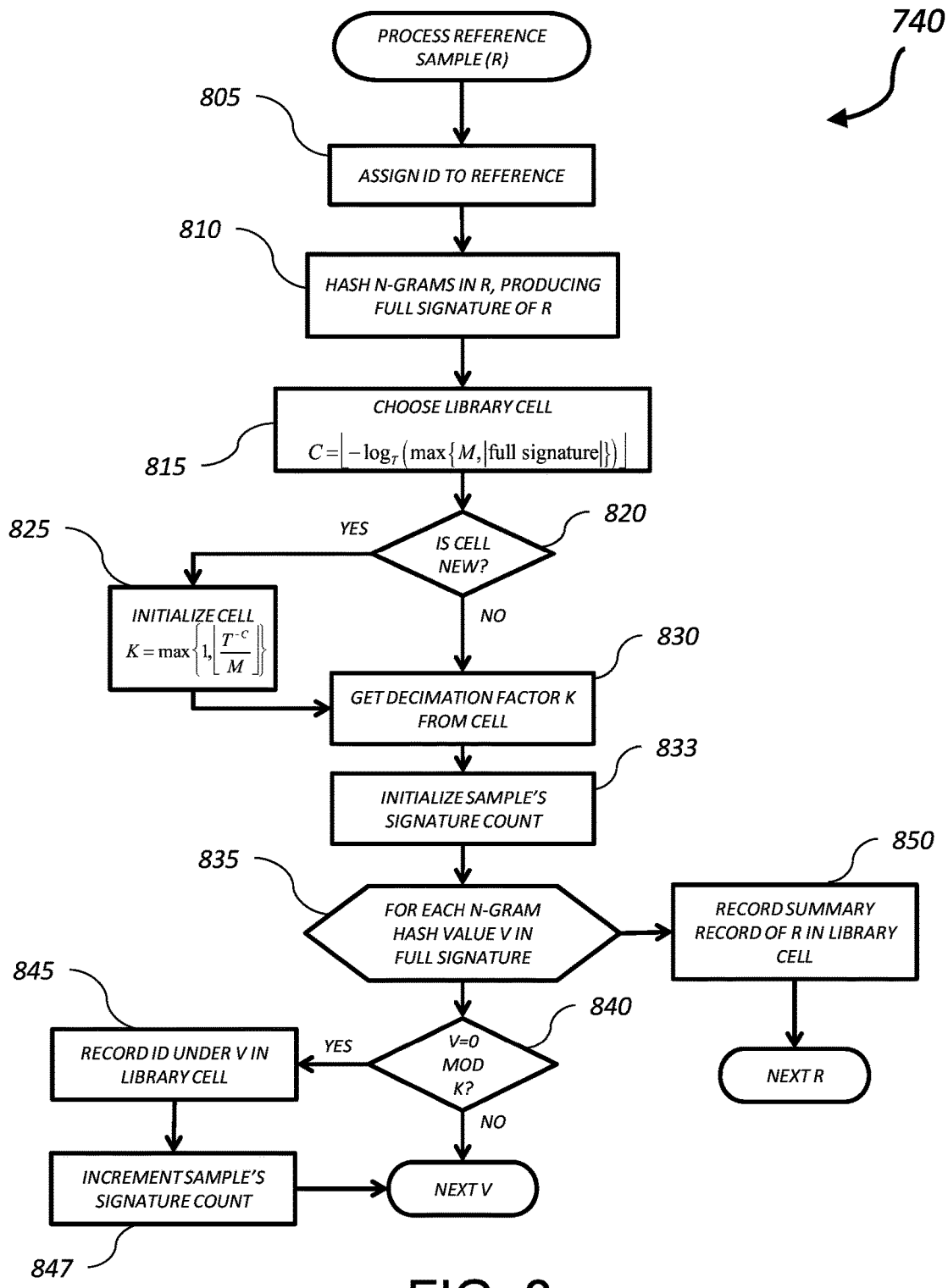
FIG. 8 illustrates a process flow showing details of one of the operations of FIG. 7 according to an example embodiment.

FIG. 8 illustrates a block diagram showing details of operation 740 above, in which a reference sample is processed, in accordance with an example embodiment. In this regard, at operation 805, a unique identity is assigned to the reference sample, denoted ID herein. A full signature of the reference sample is then produced at operation 810. The full signature may include the set of hash values of the n-grams of size N present in the reference sample. The set of hash values may be produced by recursive n-gram hashing of the sample, or may be obtained by other means. Once the size of the full signature is known, a library cell may be determined at operation 815, identified by a cell index C equal to the integer portion of the negative of the logarithm, base T, of the maximum of M and the full signature size. As an example, for a choice of T=0.5 and M=100, a full signature size of 2000 would result in a library cell of 10, a full signature size of 200 would result in a library cell of 7, and a full signature size of 20 would result in a library cell of 6.

Once the library cell is chosen, the library is consulted at operation 820 to see if the library cell is new. If it is, then the library cell is initiated at operation 825, which includes recording the cell's decimation factor, equal to the maximum of 1 and the nominal decimation factor. The nominal decimation factor may be the integer portion of the ratio of the nominal low range of the library cell and M. The nominal low range of the library cell may be the reciprocal of T raised to the power of the cell's index. The remaining details of initialization may vary with the structure used for the cell.

An alternative choice for the cell's decimation factor may be the greatest prime number less than or equal to the value given above.

In operation 830, the cell's decimation factor K may be obtained from the reference library cell. A signature count for the sample may be initialized to zero at operation 833. Operation 835 may ensure that each n-gram hash value V in the full signature of the reference sample produced by operation 810 is examined by operation 840 to see if it is congruent to 0 modulo K. If it is, then the reference's identity ID is recorded under the value V in the library cell at operation 845 and the reference sample's signature count is incremented at operation 847. To complete the recording process, operation 850 builds and records a summary record for the reference sample under the reference's identity ID. This record includes the sample's signature count and any information useful for labeling and specifying the provenance of the reference sample.

Figure 9:
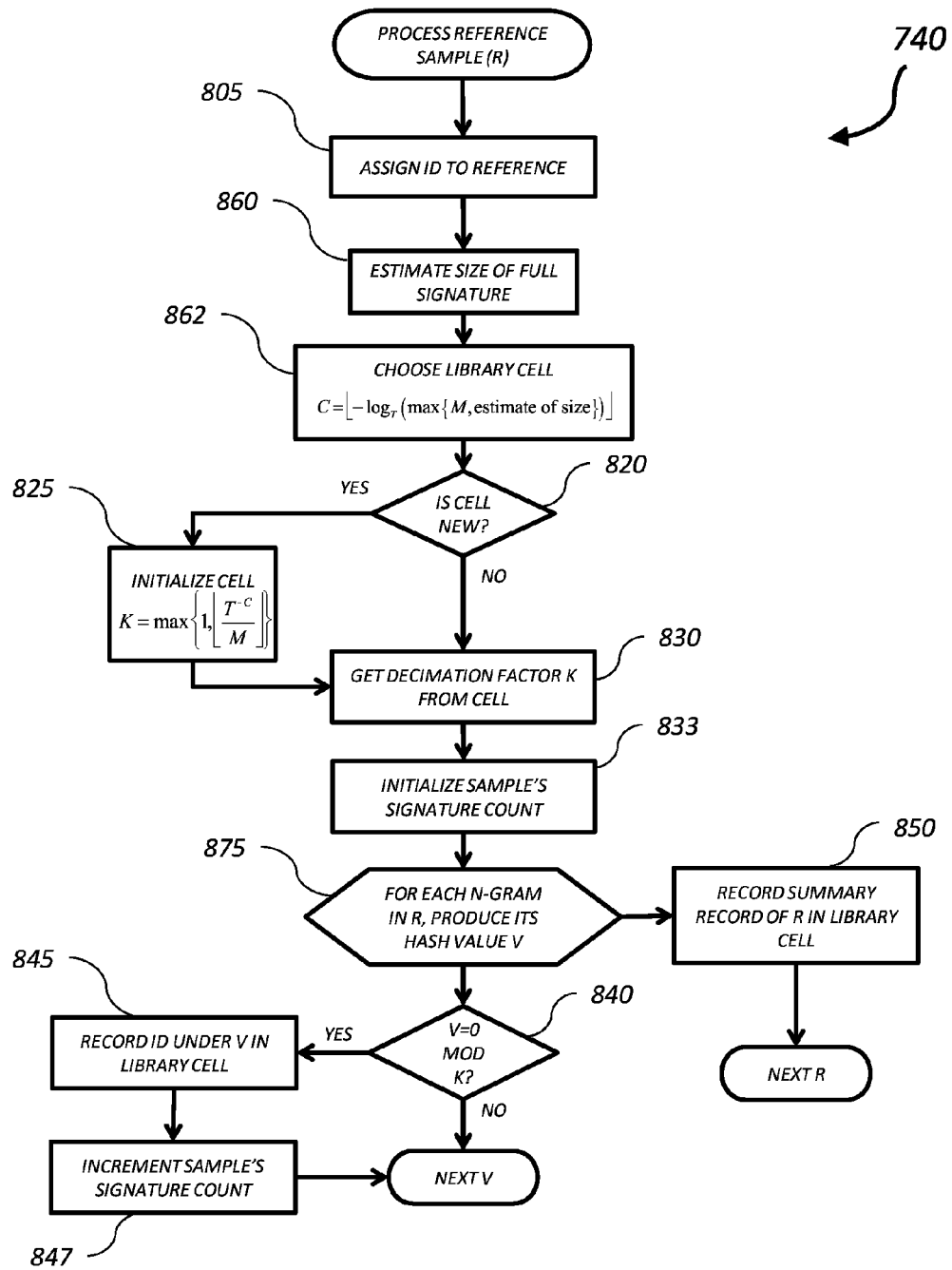
FIG. 9 illustrates a process flow showing alternative details of one of the operations of FIG. 7 according to an example embodiment.

FIG. 9 illustrates an alternative embodiment of operation 740, in which a reference sample is processed, and includes many of the same steps as the embodiment illustrated in FIG. 8. This example embodiment obviates the need to construct a full signature of the reference sample. In this embodiment, operations 860 and 862 replace operations 810 and 815 and operation 875 replaces operation 835. Operation 860 estimates the size of the full signature without needing to produce the full signature. For example, the number of tokens in the reference sample may be taken as an estimate of the number of n-grams that would constitute the full signature. Once this estimate is obtained, operation 862 involves choosing a library cell by computing a library cell index C equal to the integer portion of the negative of the log, base T, of the maximum of M and of the estimate of the size of the full signature.

Operation 875 iterates through all n-grams in the reference sample, producing a hash value of each and subjecting the resulting hash values to processing by operations 840, 845 and 847 in the same manner as in the embodiment illustrated in FIG. 8. In should be understood that operation 875 may produce the n-gram hash values without enumerating the n-grams explicitly, such as is done with recursive hashing.

Figure 10:
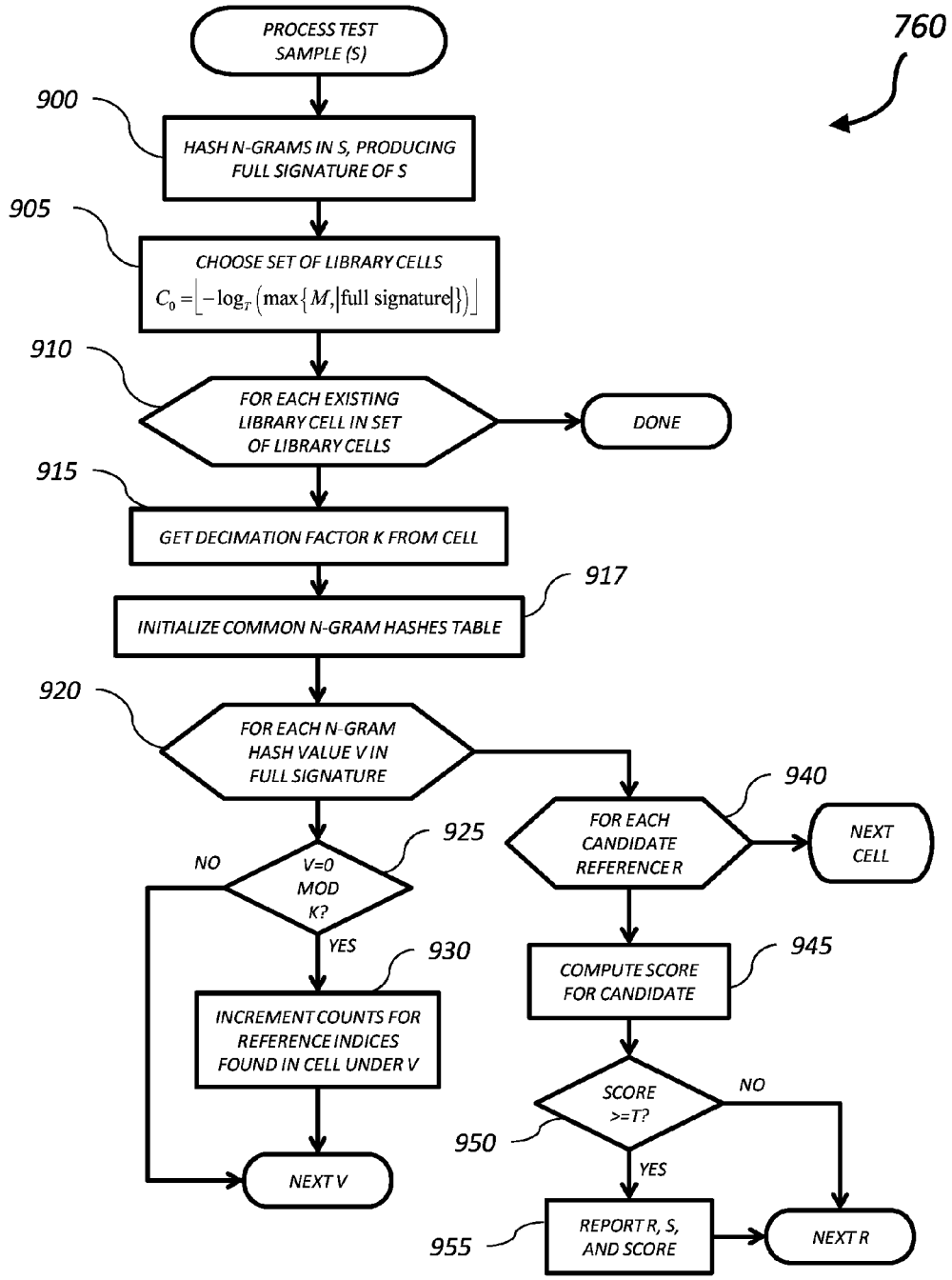
FIG. 10 illustrates a process flow showing details of another one of the operations of FIG. 7 according to an example embodiment.

FIG. 10 illustrates a more detailed explanation of operations that may be further involved in operation 760 above, in which a test sample is processed. Operation 900 may involve production of a full signature of the test sample, which may include the set of hash values of the n-grams of size N present in the test sample. The set of hash values may be produced by recursive n-gram hashing of the sample, or may be obtained by other means. Once the size of the full signature is known, operation 905 may include determining the set of library cells that should be queried. This determination may be based on the nominal cell index for the sample, identified by a cell index C0 equal to the integer portion of the negative of the logarithm, base T, of the maximum of M and the full signature size. The set of library cells, identified by their indices, is then {C0−1, C0, C0+1}.

Operation 910 may then include ensuring that for each existing library cell in the set of library cells identified by operation 905, the library cell is queried. It should be understood that the set of library cells identified by operation 905 may include cells that have not been created; such cells are ignored by operation 910.

The querying of a library cell begins with operation 915, which extracts the decimation factor K from the cell. In operation 917, a common n-gram hash counts table is initialized. This will record integer counts filed under reference sample IDs. For each n-gram hash value V in the full signature (operation 920), V is examined by operation 925 to determine if it should be used by seeing if it is congruent to zero modulo K. If so, operation 930 looks up the entry in the library cell filed under V, thereby identifying candidate references and incrementing their counts, as amplified in FIG. 11.

When operation 920 is completed, each key in the common n-gram hashes table constitutes a candidate reference R; operation 940 iterates through these candidates so that each in turn is considered as a possible match to the test sample. Consideration begins by computing the similarity score between R and S in operation 945. The score is based on the common n-gram hash count SR for R, produced in operation 930, and is equal to SR divided by SS+RR−SR, where SS is the size of the test sample's decimated signature and RR is the size of the reference sample's decimated signature, obtained from the reference sample's signature count in the reference sample's summary record. If the resulting score meets or exceeds the threshold (operation 950) then in operation 955 the match between S and R, together with their similarity score, is reported.

Figure 11:
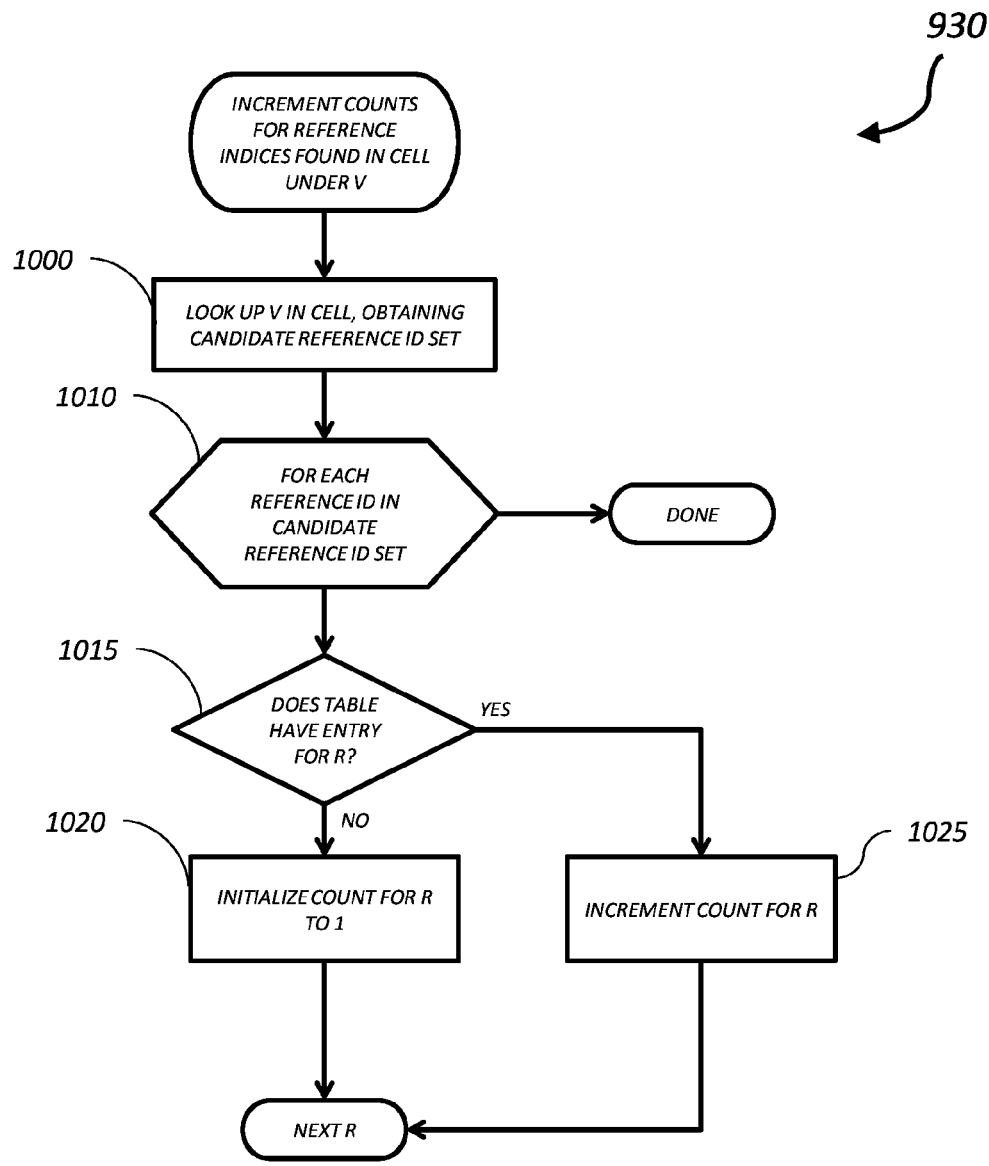
FIG. 11 illustrates a process flow showing details of one of the operations of FIG. 10 according to an example embodiment.

FIG. 11 amplifies operation 930 (increment counts for reference indices found in cell under V). An n-gram hash value V is used as a key to obtain a set of reference sample IDs in operation 1000. These are the reference IDs that were recorded in operation 845 under the value V in the current library cell. Operation 1010 loops through each reference sample ID R in the set of reference sample IDs. If R has not yet shared an n-gram hash with this sample, then an entry in the common n-gram hashes table will not exist under R and operation 1015 will direct operation 1020 to record a 1 value as the count for R in common n-gram hashes table; otherwise, operation 1025 will increment the count under R in the common n-gram hashes table.

Figure 12:
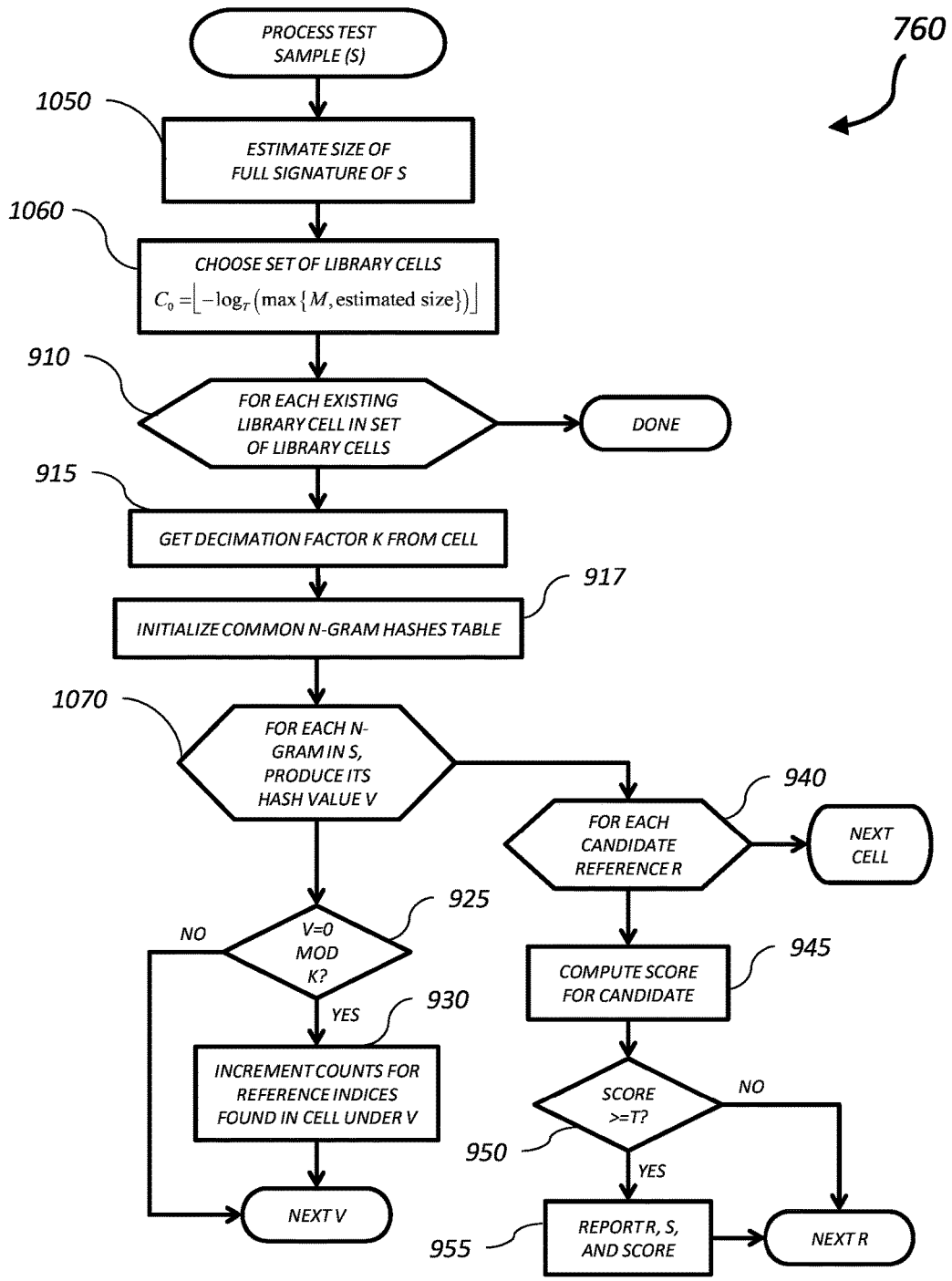
FIG. 12 illustrates a process flow showing details of one of the operations of FIG. 7 according to an example embodiment.

FIG. 12 illustrates an alternative example embodiment of operation 760 (process test sample), which comprises many of the same steps as the example embodiment illustrated in FIG. 10. In FIG. 12, operations 1050 and 1060 replace operations 900 and 905 and operation 1070 replaces operation 920. This embodiment obviates the need to construct a full signature of the test sample. Operation 1050 estimates the size of the full signature without needing to produce the full signature. For example, the number of tokens in the test sample may be taken as an estimate of the number of n-grams that would constitute the full signature. Once this estimate is obtained, operation 1060 determines the set of library cells that should be queried. This is based on the nominal cell index for the sample, identified by a cell index C0 equal to the integer portion of the negative of the logarithm, base T, of the maximum of M and the estimated full signature size. The set of library cells, identified by their indices, is then {C0−1, C0, C0+1}. Operation 1070 iterates through each n-gram in the sample and produces the hash value of that n-gram. It should be understood that operation 1070 may produce the n-gram hash values without enumerating the n-grams explicitly, such as is done with recursive hashing.

Figure 13:
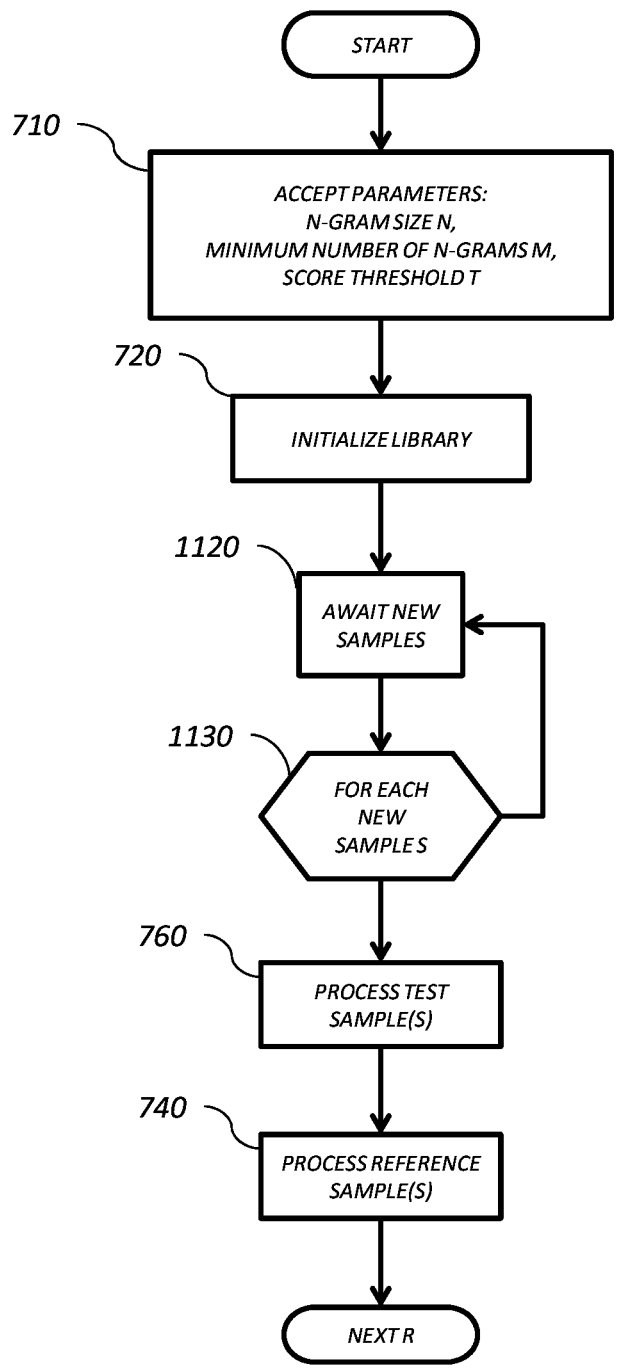
FIG. 13 illustrates a process flow showing alternatives to some of the operations of FIG. 7 according to an example embodiment.

FIG. 13 illustrates an example embodiment that may be well suited to treating all samples as both reference samples and test samples, and doing so as they become available. This embodiment uses many of the same steps as the embodiment illustrated in FIG. 7. The method begins by accepting design parameters in operation 710 and initializing the reference library in operation 720, described above. Operation 1120 waits for new samples to be presented to the apparatus. When they arrive, operation 1130 directs processing on each until they are exhausted, and control returns to operation 1120. Under the direction of operation 1130, each sample is first processed as a test sample using operation 760 described above, so that any matches between the new sample and all samples that came before may be detected and reported. Thereafter, the new sample is treated as a reference sample and processed by operation 740, described above, to record its information in the reference library. A variant of the embodiment illustrated in FIG. 13 may combine steps 760 and 740 so that common work need not be performed twice.

Figure 14:
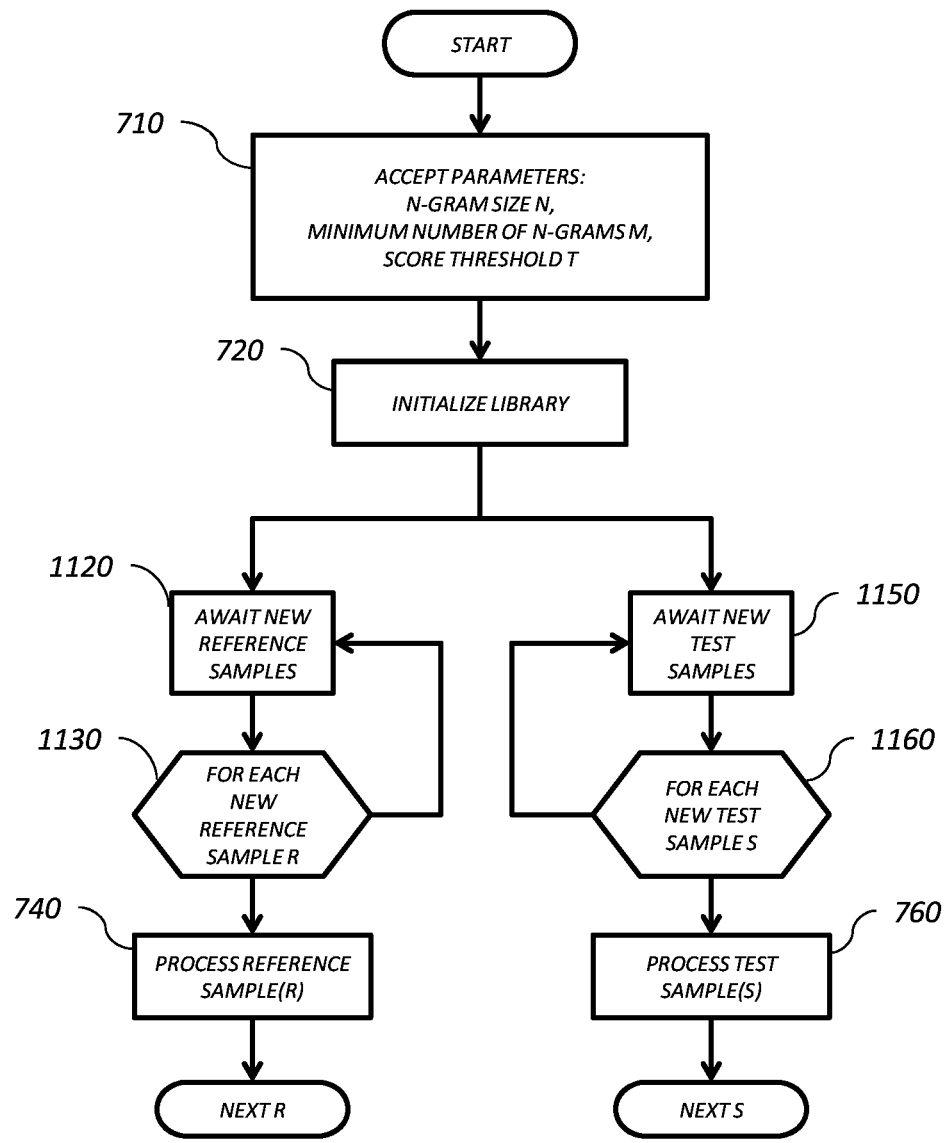
FIG. 14 illustrates a process flow showing alternatives to some of the operations of FIG. 7 according to an example embodiment.

FIG. 14 illustrates an example embodiment of the invention that accommodates both reference samples and test samples as they become available. This embodiment uses many of the same steps as the embodiment illustrated in FIG. 7 and FIG. 13. The method begins by accepting design parameters in operation 710 and initializing the reference library in operation 720, described above. After that, two processes continue asynchronously. One process, comprising the operations 1120, 1130, and 740 handles reference samples; the other process, comprising operations 1150, 1160, and 760 handles test samples.

Operation 1120 awaits the arrival of reference samples. When reference samples have arrived, operation 1130 iterates through them, processing each using operation 740 described above. When it has exhausted the new reference samples, it returns to operation 1120 to await further reference samples. Operation 1150 awaits the arrival of test samples. When test samples have arrived, operation 1160 iterates through them, processing each using operation 760 described above. When it has exhausted the new test samples, it returns to operation 1150 to await further test samples. Although some embodiments described herein use a single n-gram size, some embodiments may accommodate n-grams of mixed size. Although some embodiments described herein use a single threshold for determining partitioning and score acceptance, the thresholds may be different for those two uses. Indeed, other partitioning schemes may be employed that do not partition based on powers of any threshold.

Figure 15:
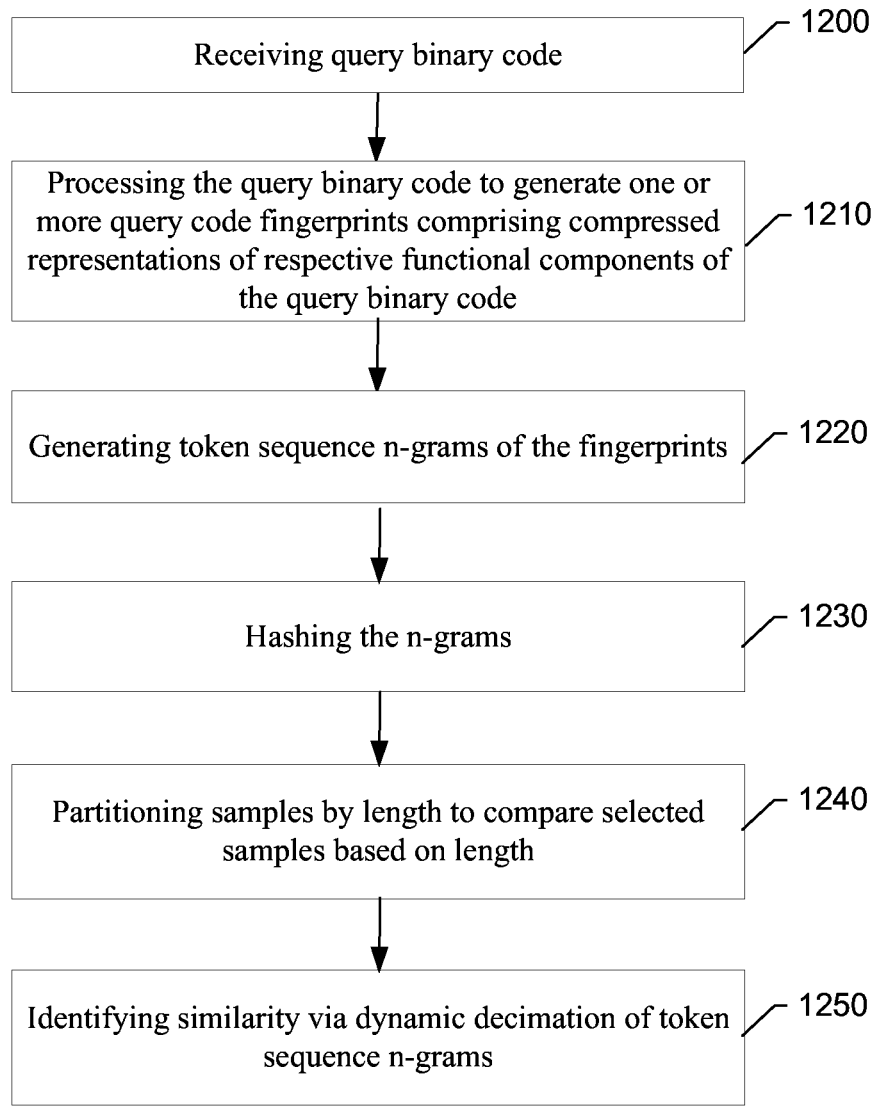
FIG. 15 illustrates a method of identifying related code variants according to an example embodiment.

From a technical perspective, the code analyzer 44 (or the scoring module 130 of the code analyzer 44) described above may be used to support some or all of the operations described above. As such, the platform described in FIGS. 2 and 6 may be used to facilitate the implementation of several computer program and/or network communication based interactions. As an example, FIG. 15 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 15, may include receiving query binary code at operation 1200, processing the query binary code to generate one or more query code fingerprints comprising compressed representations of respective functional components of the query binary code at operation 1210, generating token sequence n-grams of the fingerprints at operation 1220, and hashing the n-grams at operation 1230. In some embodiments, the method may include additional operations such as, for example, partitioning samples by length to compare selected samples based on length at operation 1240, and identifying similarity via dynamic decimation of token sequence n-grams at operation 1250.

In an example embodiment, an apparatus for performing the method of FIG. 10 above may comprise a processor (e.g., the processor 52) or processing circuitry configured to perform some or each of the operations (1200-1250) described above. The processor may, for example, be configured to perform the operations (1200-1250) by performing hardware implemented logical functions, executing stored instructions, or executing algorithms for performing each of the operations. In some embodiments, the processor or processing circuitry may be further configured for additional operations or optional modifications to operations 1200 to 1250. In this regard, for example, processing the reference binary codes may include converting the reference binary codes into source code (or other functional representation code) and breaking the source code into individual functions. In some cases, processing the reference binary code may further include assigning a respective token to each corresponding unit portion of each respective one of the individual functions, and mapping each token to a character to define an ordered string of characters that form the compressed representation.

Locally installed antivirus protection may employ portions or all of example embodiments, or may provide inputs to example embodiments for processing and analysis. Network operations center operators that are not necessarily skilled analysts may utilize tools of an example embodiment to identify software or binaries that should be further analyzed by skilled analysts as part of a seamless environment that enables drill down capabilities and various levels of analytical tools to be employed (e.g., via the network 30). Accordingly, data and visualizations that support immediate analytical needs for both rapid response and back end analysis and update may be provided.

Example embodiments may therefore enable efficient searching for binary files by preprocessing all binaries that are to be searched (e.g., reference binaries) and preprocessing a query binary in the same manner. Similarity measurements or scores may then be performed on similarly compressed representations of the functional portions of binaries or text samples. Reports may be generated to indicate the reference functions of portions analyzed, the binaries or other texts from which they came, any similar (or the most similar) binaries/texts to analyzed binaries/texts, and/or the like. The reports may be able to identify which parts of the code are standard or have been seen previously, and which parts appear to be altered or new. The total number of functions reported can be limited, as desired. Thus, for example, only the top ten scores could be reported. Alternatively, example embodiments may use a more absolute notion of similarity and report all functions that are determined to be similar to a query function. However, similarity must be defined in such a context. Thus, for example, a threshold similarity measure or score may be defined so that when the threshold score is reached, the corresponding functions are considered to be similar. Other approaches may also be undertaken.

It is understood by those skilled in the art that the operations enumerated in the example embodiments may be implemented by any combination of software, firmware, and hardware suited to the application, design constraints, and design figures of merit and that steps may, in many cases, be combined, divided, or reordered, all without deviating from the spirit of this disclosure. Moreover, it should be understood that this disclosure can benefit from implementations that employ parallel computation facilities with multiple threads for the purpose of increasing capacity and reliability; such implementations are anticipated by this disclosure and are within the spirit of example embodiments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus for efficiently detecting malicious software code in a manner that reduces processing and memory utilization, the apparatus comprising:
   a computing device comprising processing circuitry and a memory configured to analyze code to detect malware, the processing circuitry configured to execute instructions for:
      receiving query binary code for analysis to determine if the query binary code includes malware;
      generating token sequence n-grams based on the query binary code;
      hashing the token sequence n-grams;
      partitioning samples by length to compare selected samples based on length, wherein the samples are based on the token sequence n-grams;
      generating an n-gram score using a dynamic decimation of a selected sample based on the token sequence n-grams and a plurality of reference samples, wherein the n-gram score is indicative of a similarity between the selected sample and at least one of the reference samples; and
      reporting, based on the n-gram score, a malware threat as an output to a user, wherein the reporting includes the n-gram score and an indication of a match between the selected sample and the at least one of the reference sample.

2. The apparatus of claim 1, wherein generating the n-gram score based on the dynamic dissemination of the token sequence n-grams comprises:
   accepting a score threshold T;
   calculating a library cell function I( ) that maps a range of sizes to a library cell;
   calculating a decimation factor function K( ) that maps a library cell to a non-negative number;
   receiving the plurality of reference samples;
   processing each reference sample of the plurality of reference samples via operations including:
      producing a sequence of reference tokens from the reference sample;
      producing a full reference signature, the full reference signature comprising the hash values of the set of n-grams present in the sequence of reference tokens;
      choosing a library cell equal to I( ) applied to the size of the full reference signature;
      choosing a reference decimation factor equal to K( ) applied to the library cell;
      decimating the full reference signature by the decimation factor to produce a decimated reference signature; and
      recording the decimated reference signature in the library cell together with an identifier of the reference sample;
   receiving one or more test samples;
   processing each test sample via operations including:
      producing a sequence of test tokens from the test sample;
      producing a full test signature, the full test signature comprising the hash values of the set of n-grams present in the sequence of test tokens;
      choosing a set of library cells on the basis of I( ) applied to the size of the full test signature;
   for each library cell of the set of library cells:
      choosing a test decimation factor equal to K( ) applied to the library cell;
      decimating the full test signature by the test decimation factor to produce a decimated test signature;

for each decimated reference signature in the library cell, scoring the decimated test signature against the decimated reference signature and reporting the resulting score and identifier stored with the decimated reference signature in the event that the score meets or exceeds T.

3. The apparatus of claim 2, wherein:
each of the reference samples is a code binary; and
each of the test samples is a code binary.

4. The apparatus of claim 2, wherein:
integer M is a design parameter and specifies a minimum nominal decimated signature size; and
the function K( ) applied to a library cell produces a consistent number close to the maximum of 1 and m/M, where m is the minimum of the sample size range I( ) maps to the library cell.

5. The apparatus of claim 4, wherein:
each of the reference samples is a code binary or a passage of text; and
each of the test samples is a code binary or passage of text.

6. The apparatus of claim 4, wherein:
C is a design parameter and specifies the minimum cell index;
P is the reciprocal of T;
the library cell function I( ) applied to integer x returns the maximum of C and the integer portion of the logarithm base P of the maximum of x and M; and
choosing the set of library cells on the basis of I( ) applied to the size of the full test signature comprises computing I=I( ) applied to the size of the full signature and returning the set of cells {I−1, I, I+1}.

7. The apparatus of claim 6, wherein:
each of the reference samples is a code binary; and
each of the test samples is a code binary.

8. The apparatus of claim 6, wherein:
each of the reference samples is a passage of text; and
each of the test samples is a passage of text.

9. The apparatus of claim 2, wherein:
X is a design parameter;
decimating the full reference signature by the decimation factor to produce the decimated reference signature comprises selecting only those values in the full reference signature that are equal to X modulo the decimation factor; and
decimating the full test signature by the decimation factor to produce the decimated test signature comprises selecting only those values in the full test signature that are equal to X modulo the decimation factor.

10. The apparatus of claim 1, wherein:
each of the reference samples is a passage of text; and
each of the test samples is a passage of text.

11. The apparatus of claim 1 wherein the processing circuitry configured to execute instructions for generating the n-gram score includes being configured to is configured execute instructions for:
decimating the selected sample by a decimation factor to produce a decimated reference signature;
decimating the plurality of reference samples by a test decimation factor to produce decimated test signatures; and
scoring the decimated test signatures against the decimated reference signature to generate the n-gram score.

12. A method for efficiently detecting malicious software code in a manner that reduces processing and memory utilization, the method comprising:
receiving query binary code for analysis to determine if the query binary code includes malware, the query binary code being received at a computing device comprising processing circuitry and a memory configured to analyze code to detect malware;
generating token sequence n-grams based on the query binary code;
hashing the token sequence n-grams;
partitioning samples by length to compare selected samples based on length, wherein the samples are based on the token sequence n-grams;
generating, by the processing circuitry, an n-gram score using a dynamic decimation of a selected sample based on the token sequence n-grams and a plurality of reference samples, wherein the n-gram score is indicative of a similarity between the selected sample and at least one of the reference samples; and
reporting, based on the n-gram score, a malware threat as an output to a user, wherein the reporting includes the n-gram score and an indication of a match between the selected sample and the at least one of the reference sample.

13. The method of claim 12, wherein generating the n-gram score based on the dynamic dissemination of the token sequence n-grams comprises:
accepting a score threshold T;
calculating a library cell function I( ) that maps a range of sizes to a library cell;
calculating a decimation factor function K( ) that maps a library cell to a non-negative number;
receiving the plurality of reference samples;
processing each reference sample of the plurality of reference samples via operations including:
producing a sequence of reference tokens from the reference sample;
producing a full reference signature, the full reference signature comprising the hash values of the set of n-grams present in the sequence of reference tokens;
choosing a library cell equal to I( ) applied to the size of the full reference signature;
choosing a reference decimation factor equal to K( ) applied to the library cell;
decimating the full reference signature by the decimation factor to produce a decimated reference signature; and
recording the decimated reference signature in the library cell together with an identifier of the reference sample;
receiving one or more test samples;
processing each test sample via operations including:
producing a sequence of test tokens from the test sample;
producing a full test signature, the full test signature comprising the hash values of the set of n-grams present in the sequence of test tokens;
choosing a set of library cells on the basis of I( ) applied to the size of the full test signature;
for each library cell of the set of library cells:
choosing a test decimation factor equal to K( ) applied to the library cell;
decimating the full test signature by the test decimation factor to produce a decimated test signature;
for each decimated reference signature in the library cell, scoring the decimated test signature against the decimated reference signature and reporting the resulting score and identifier stored with the decimated reference signature in the event that the score meets or exceeds T.

14. The method of claim 13, wherein:
each of the reference samples is a code binary; and
each of the test samples is a code binary.

15. The method of claim 13, wherein:
integer M is a design parameter and specifies a minimum nominal decimated signature size; and
the function K( ) applied to a library cell produces a consistent number close to the maximum of 1 and m/M, where m is the minimum of the sample size range I( ) maps to the library cell.

16. The method of claim 15, wherein:
each of the reference samples is a code binary or a passage of text; and
each of the test samples is a code binary or passage of text.

17. The method of claim 15, wherein:
C is a design parameter and specifies the minimum cell index;
P is the reciprocal of T;
the library cell function I( ) applied to integer x returns the maximum of C and the integer portion of the logarithm base P of the maximum of x and M; and
the method of choosing a set of library cells on the basis of I( ) applied to the size of the full test signature comprises computing I=I( ) applied to the size of the full signature and returning the set of cells {I−1, I, I+1}.

18. The method of claim 17, wherein:
each of the reference samples is a code binary; and
each of the test samples is a code binary.

19. The method of claim 17, wherein:
each of the reference samples is a passage of text; and
each of the test samples is a passage of text.

20. The method of claim 13, wherein:
X is a design parameter;
decimating the full reference signature by the decimation factor to produce the decimated reference signature comprises selecting only those values in the full reference signature that are equal to X modulo the decimation factor; and
decimating the full test signature by the decimation factor to produce the decimated test signature comprises selecting only those values in the full test signature that are equal to X modulo the decimation factor.

21. The method of claim 12, wherein:
each of the reference samples is a passage of text; and
each of the test samples is a passage of text.

* * * * *